United States Patent
Klochikhin et al.

(10) Patent No.: US 12,480,767 B2
(45) Date of Patent: Nov. 25, 2025

(54) SYSTEM AND METHOD FOR HIGH ACCURACY PEDESTRIAN LOCATION DETERMINATION AND PEDESTRIAN NAVIGATION

(71) Applicant: Parkofon Inc., Vienna, VA (US)

(72) Inventors: Evgeny Klochikhin, Alexandria, VA (US); Paul Balzer, Freital (DE); Iuri Iatsinin, Tambov (RU); Elena Urman, Damascus, MD (US)

(73) Assignee: PARKOFON INC., Vienna, VA (US)

( * ) Notice: Subject to any disclaimer, the term of this patent is extended or adjusted under 35 U.S.C. 154(b) by 129 days.

(21) Appl. No.: 18/386,841

(22) Filed: Nov. 3, 2023

(65) Prior Publication Data

US 2025/0146825 A1    May 8, 2025

(51) Int. Cl.
*G01C 21/20* (2006.01)

(52) U.S. Cl.
CPC .................. *G01C 21/206* (2013.01)

(58) Field of Classification Search
CPC ............... B60L 53/305; B60L 53/665; B60L 2240/622; B60S 5/02; G01S 19/02; G01S 19/14; G01S 19/22; G01S 19/34; G01S 19/49; G01S 5/017; G01S 5/0284; G01C 21/206; H04W 4/021; H04W 4/027; H04W 4/029; H04W 4/24; H04W 4/38; H04W 4/40
See application file for complete search history.

(56) References Cited

U.S. PATENT DOCUMENTS

| | | | |
|---|---|---|---|
| 6,122,960 A * | 9/2000 | Hutchings | G01C 22/006 73/865.4 |
| 11,002,547 B2 * | 5/2021 | Lemarchand | G01P 13/00 |
| 2009/0091477 A1 * | 4/2009 | Mc Call | G01S 19/42 340/990 |
| 2009/0198155 A1 * | 8/2009 | Bonnet | A61B 5/1038 600/595 |
| 2013/0036037 A1 * | 2/2013 | Meredith | G06Q 40/00 705/35 |
| 2015/0316579 A1 * | 11/2015 | Pakzad | G01C 22/006 702/150 |

(Continued)

FOREIGN PATENT DOCUMENTS

| | | | | |
|---|---|---|---|---|
| CA | 2943516 C | * | 4/2019 | H04W 4/10 |
| CN | 108318033 A | * | 7/2018 | G01C 21/20 |

(Continued)

*Primary Examiner* — Babar Sarwar
(74) *Attorney, Agent, or Firm* — Resolute Legal PLLC

(57) ABSTRACT

The various systems and methods disclosed herein provide for cost effective and high accuracy location detection. In some implementations of the system and method for high accuracy location detection, a mobile location device obtains and calculates location data from a plurality of sources without requiring expensive and power inefficient processors. In some implementations, such cost effective and high accuracy location detection by the mobile location device is used in improved pedestrian location systems and methods. In some such implementations, the mobile location device communicates with remote geomapping servers and pedestrian navigation systems to provide pedestrian navigational guidance which may include pedestrian navigational guidance for the visually impaired.

19 Claims, 9 Drawing Sheets

(56) References Cited

U.S. PATENT DOCUMENTS

| | | | | |
|---|---|---|---|---|
| 2015/0339952 A1* | 11/2015 | Glazer | .................. | G09B 23/24 |
| | | | | 434/298 |
| 2016/0088440 A1* | 3/2016 | Palanki | ................ | G01S 5/0249 |
| | | | | 455/456.1 |
| 2016/0171546 A1* | 6/2016 | Gartenberg | ........ | G06Q 30/0261 |
| | | | | 705/14.58 |
| 2016/0188977 A1* | 6/2016 | Kearns | .................. | B25J 11/002 |
| | | | | 348/113 |
| 2017/0118597 A1* | 4/2017 | Swirsky | ................. | G06F 3/165 |
| 2018/0091939 A1* | 3/2018 | Venkatraman | ........ | H04W 4/021 |
| 2018/0315313 A1* | 11/2018 | Klochikhin | ............. | G01P 15/14 |
| 2021/0232819 A1* | 7/2021 | VanBlon | ................ | G06F 3/017 |
| 2023/0138050 A1* | 5/2023 | Han | .................... | G01S 5/02585 |
| | | | | 455/456.1 |

FOREIGN PATENT DOCUMENTS

| | | | | |
|---|---|---|---|---|
| EP | 3617735 A1 * | 3/2020 | .............. | H04W 4/46 |
| EP | 3194889 B1 * | 4/2021 | .............. | G01C 21/12 |
| WO | WO-2015069577 A1 * | 5/2015 | ........... | G01S 5/0295 |
| WO | WO-2016042296 A2 * | 3/2016 | ........... | G01C 21/206 |
| WO | WO-2018060666 A1 * | 4/2018 | ........... | H04W 36/32 |
| WO | WO-2018188991 A1 * | 10/2018 | ........... | G01C 21/165 |
| WO | WO-2021141770 A1 * | 7/2021 | ........ | G06F 18/23211 |

\* cited by examiner

SYSTEM AND METHOD FOR HIGH ACCURACY PEDESTRIAN LOCATION DETERMINATION AND PEDESTRIAN NAVIGATION

FIELD OF THE DISCLOSURE

The present disclosure relates to the fields of high accuracy pedestrian location determination and pedestrian navigation, and high accuracy location determination more generally.

BACKGROUND

Previous approaches to location devices have typically relied on global navigation satellite systems (GNSS) data to determine positioning. GNSS data provides information about the location of the pedestrian based on signals received from satellites. However, these approaches have faced challenges in accurately determining the position of a pedestrian. Therefore, there is a need to more accurately determine the position of a pedestrian.

SUMMARY

The various systems and methods disclosed herein provide for cost effective, efficient, and high accuracy location detection. In some implementations of the system and method for high accuracy location detection, a mobile location device obtains and calculates accurate location data from a plurality of sources such as global navigation satellite systems (GNSS), microelectromechanical system-inertial measurement unit (MEMS-IMU), and geographic information systems (GIS) without requiring expensive and power inefficient processors to read raw GNSS data.

In some aspects, the techniques described herein relate to a location device including: a processor; and a memory device that stores a plurality of instructions, which when executed by the processor, causes the processor to be configured to: configure an estimation filter having at least two modes, the at least two modes including a standing mode and a walking mode, to operate in the walking mode; receive, global navigation satellite systems (GNSS) data and inertial sensor data, wherein the GNSS data and the inertial sensor data are associated with a pedestrian; calculate, an acceleration related value of the pedestrian based on the inertial sensor data; determine that the acceleration related value is below a standing activity threshold; alter the estimation filter to operate in the standing mode based on the acceleration related value being below the standing activity threshold; calculate, in the estimation filter operating in the standing mode, a position location of the pedestrian, wherein at least some of the GNSS data and the inertial sensor data is altered for the estimation filter to determine the position location of the pedestrian; and transmit the position location of the pedestrian to a geomapping server enabling a pedestrian navigation system.

In some aspects, the techniques described herein relate to a location device, wherein the alteration of the at least some of the GNSS data and the inertial sensor data results in data for a pedestrian velocity being altered.

In some aspects, the techniques described herein relate to a location device, wherein the acceleration related value is based on a gravitational component of the inertial sensor data.

In some aspects, the techniques described herein relate to a location device, wherein the acceleration related value for the pedestrian is determined from a function of a gravitational component of the inertial sensor data.

In some aspects, the techniques described herein relate to a location device, wherein the function is a linear function of the gravitational component of the inertial sensor data.

In some aspects, the techniques described herein relate to a location device, wherein the processor is further configured to calculate and communicate to the geomapping server a plurality of location points when the estimation filter is operating in the standing mode.

In some aspects, the techniques described herein relate to a location device, wherein the processor is further configured to calculate and communicate to the geomapping server a plurality of location points when the estimation filter is operating in the walking mode.

In some aspects, the techniques described herein relate to a location device, wherein the estimation filter is a Kalman filter, and wherein the Kalman filter includes a plurality of modes.

In some aspects, the techniques described herein relate to a location device, wherein the estimation filter is a constant heading constant velocity Kalman filter and the Kalman filter maintains state variables including an x position coordinate, a y position coordinate, a speed and a heading of the pedestrian.

In some aspects, the techniques described herein relate to a location device, wherein the pedestrian navigation system includes a navigation application operating on a user device of the pedestrian.

In some aspects, the techniques described herein relate to a location device, wherein the pedestrian navigation system generates audio guidance for the pedestrian.

In some aspects, the techniques described herein relate to a method for processing pedestrian location including: configuring an estimation filter having at least two modes, the two modes including a standing mode and a walking mode, to operate in the walking mode; receiving, global navigation satellite systems (GNSS) data and inertial sensor data, wherein the GNSS data and the inertial sensor data are associated with a pedestrian; calculating, an acceleration related value of the pedestrian based on the inertial sensor data; determining that the acceleration related value is below a standing activity threshold; altering the estimation filter to operate in the standing mode based on the acceleration related value being below the standing activity threshold; calculating, in the estimation filter operating in the standing mode, a position location of the pedestrian, wherein at least some of the GNSS data and the inertial sensor data is altered for the estimation filter to determine the position location of the pedestrian; and transmitting the position location of the pedestrian to a geomapping server enabling a pedestrian navigation system.

In some aspects, the techniques described herein relate to a method, wherein the alteration of the at least some of the GNSS data and the inertial sensor data results in data for a pedestrian velocity being altered.

In some aspects, the techniques described herein relate to a method, wherein the acceleration related value is based on a gravitational component of the inertial sensor data.

In some aspects, the techniques described herein relate to a method, wherein the acceleration related value for the pedestrian is determined from a function of a gravitational component of the inertial sensor data.

In some aspects, the techniques described herein relate to a method, wherein the function is a linear function of the gravitational component of the inertial sensor data.

In some aspects, the techniques described herein relate to a method, further including, calculating and communicating to the geomapping server a plurality of location points when the estimation filter is operating in the standing mode.

In some aspects, the techniques described herein relate to a method, further including, calculating and communicating to the geomapping server a plurality of location points when the estimation filter is operating in the walking mode.

In some aspects, the techniques described herein relate to a method, wherein the estimation filter is a Kalman filter, and wherein the Kalman filter includes a plurality of modes.

In some aspects, the techniques described herein relate to a method, wherein the estimation filter is a constant heading constant velocity Kalman filter and the Kalman filter maintains state variables including an x position coordinate, a y position coordinate, a speed and a heading of the pedestrian.

In some aspects, the techniques described herein relate to a method, wherein the pedestrian navigation system includes a navigation application operating on a user device of the pedestrian.

DETAILED DESCRIPTION

The disclosure herein provides various implementations of cost effective, efficient, and high accuracy location detection systems from which those skilled in the art shall appreciate various novel approaches and features developed by the inventors. These various novel approaches and features, as they may appear herein, may be used individually, or in combination with each other, as desired.

In particular, the implementations described, and references in the specification to "one implementation", "an implementation", "an example implementation", etc., indicate that the implementation(s) described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, persons skilled in the art may implement such feature, structure, or characteristic in connection with other implementations whether or not explicitly described.

Figure 1:
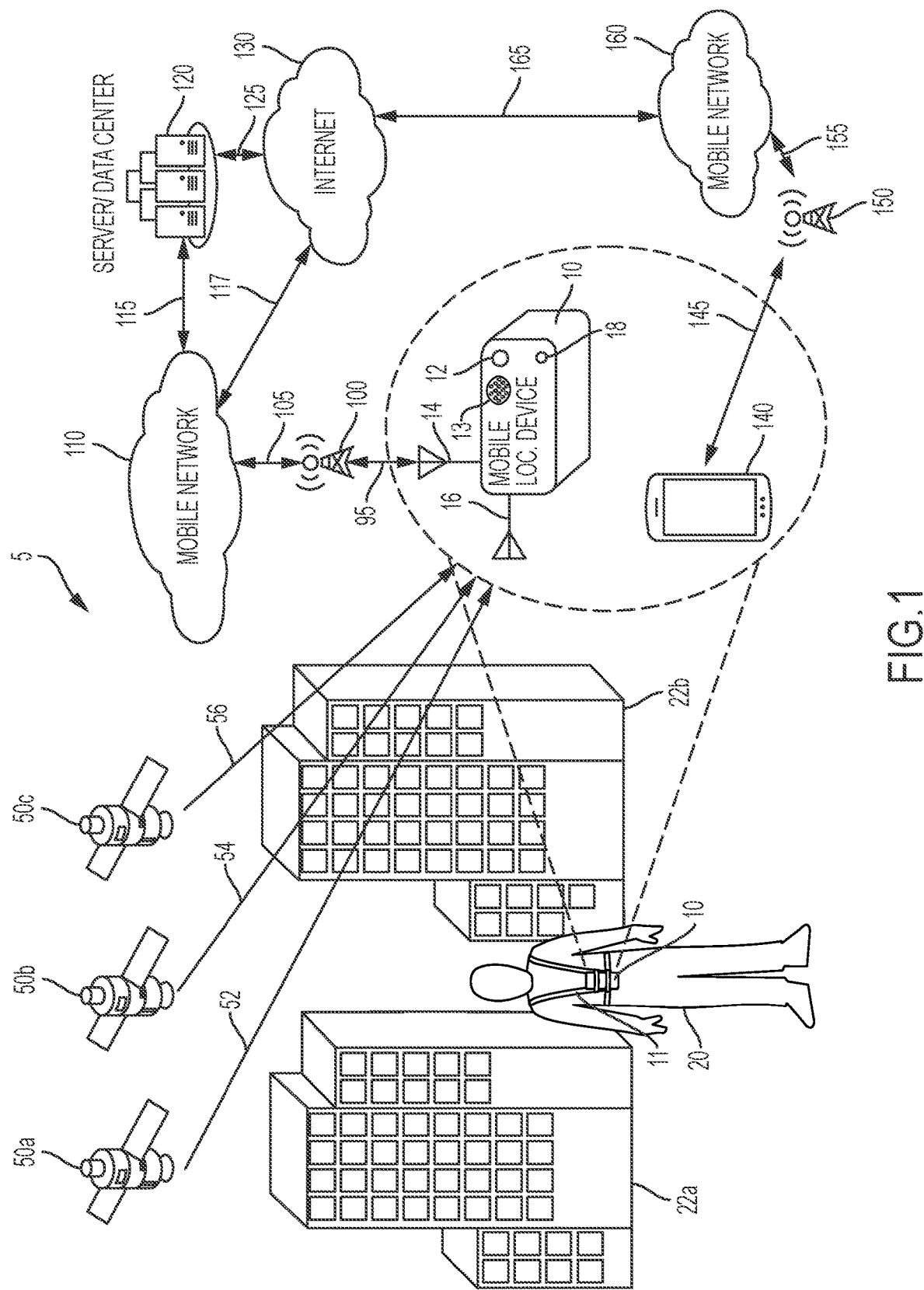
FIG. 1 is a perspective view of some implementations of a pedestrian having a mobile location device that is in communication with numerous different systems to determine the location of the pedestrian with a high degree of accuracy.

FIG. 1 is a perspective view of some implementations of a location system 5 that provides low cost, high accuracy location detection. The location system 5 includes a mobile location device 10. In some implementations, mobile location device 10 can comprises one or more location processors that can determine a location of the mobile location device 10 within a few meters of accuracy within a geographic area. In some implementations, the location accuracy is within four meters or less of accuracy. However, other suitable levels of accuracy may be achieved. The mobile location device 10 can determine a location using one or more sources of location data. In some implementations, the mobile location device 10 may comprise a user interface such as an indicator light 12 and a user interface button 18 which may indicate a power on condition (or other state of operation) and effect a power on or power off (or sleep mode), respectively, of mobile location device 10. In some implementations, mobile location device 10 may comprise a charging/connection port or inductive charging function useable by a user to charge a battery comprised by mobile location device 10. In some implementations, mobile location device 10 may comprise additional indicators and buttons (not shown in FIG. 1), such as a charging indicator to indicate a charging state of an internal battery comprised by mobile location device 10, a reset button usable to reset mobile location 10 to a known state of operation, and the like. In some implementations, mobile location device may further comprise an audio speaker 13. Mobile location device 10 comprises antennas 14 and 16, wherein in some implementations, the antennas are not visible and are contained within the mobile location device 10. It should be appreciated that the mobile location device 10 may comprise more indicator lights or no indicator lights; fewer, no or more user interface buttons; no or more audio speakers; and fewer or more antennas. Mobile location device 10 may include a user interface screen (not shown) in some implementations. Mobile location device 10 may include other features as discussed below. Mobile location device 10 may be worn by a pedestrian 20, e.g., worn as depicted in a chest harness 11, or worn in a belt harness, carried in a pocket, worn in a backpack, carried in a backpack, or the like. The mobile location device 10 is configured to work in a variety of different locations, including "urban canyons" created when mobile location device 10 and pedestrian 20 are near or within buildings such as building 22a and 22b. These "urban canyons" and buildings, and other structures, may create multipath signal distortions that previously made it difficult to resolve locations of Global Navigation Satellite System (GNSS) receivers/processors (GNSS units) absent extremely expensive hardware solutions that may require excessive amounts of power.

Mobile location device 10, as shown in FIG. 1, is in communication with a plurality of different devices and systems to aid in detecting the location (e.g., geographic position) of mobile location device 10. In some implementations, mobile location device 10 is in communication with a plurality of different satellite systems, such as satellite system 50*a*, satellite system 50*b*, and satellite system 50*c*. Mobile location device 10 may receive location signal 52 from satellite system 50*a*; location signal 54 from satellite system 50*b*; and location signal 56 from satellite system 50*c* through antenna 16. Satellite system 50*a* may comprise a global positioning system (GPS) satellite system, which comprises a plurality of satellites. Satellite system 50*b* may comprise a Global Orbiting Navigation Satellite System (GLONASS), which comprises a plurality of satellites. Satellite system 50*c* may comprise a Galileo satellite system, which comprises a plurality of satellites. It should be appreciated that in some implementations, mobile location device 10 may receive signals from fewer satellite systems (e.g., satellite system 50*a*, but not other satellite systems 50*b* and 50*c*) and/or other satellite systems. In other implementations, mobile location device 10 may receive signals from more satellite systems than illustrated. In some implementations, where mobile location device 10 is unable to receive satellite signals, mobile location device 10 may not receive signals from any satellite. In some implementations, the mobile location device 10 is a self-contained unit that includes one or more of the modules discussed in FIG. 3 (e.g., geolocation positioning system 320, MEMS-IMU system 330, where MEMS-IMU stands for "microelectromechanical system-inertial measurement unit", etc.). While mobile location device 10 is described above comprising multiple different components and described as a separate system from other user devices, in some implementations, the mobile location device 10 may be an embedded system in a user device 140, such as a user communication device (e.g., mobile phone, smartphone) or an electronic assistant device for the visually impaired. As an embedded system, one or more functions of the mobile location device 10, including functions of the processor 310, can be integrated into existing componentry of a user device 140.

Mobile location device 10 may communicate through antenna 14 with a mobile network 110 through one or more cellular access points 100 via communication link 95. Cellular access points 100 may communicate with the mobile network 110 via communication link 105. It should be appreciated that mobile network 110 may include hundreds or thousands of cellular access points 100 and communication links 105 to provide access to the mobile network 110. In some implementations, through the mobile network 110, the mobile location device 10 may communicate via communication link 117, internet 130 and communication link 125 with one or more servers and databases in data center 120. In some implementations, through the mobile network 110, the mobile location device 10 may communicate via communication link 115 with one or more servers and databases in data center 120. Such servers may be described as geomapping servers herein, which may include location services and may include navigation services. In some implementations, system 5 may include a plurality of different data centers spread throughout a particular country or throughout the world to ensure that mobile location device 10 has access to smooth and low latency communication to location services and navigation services provided by servers in data center 120. In some implementations, mobile network 110 provides a secure connection between mobile location device 10 and servers in data center 120. In some implementations, the secure connection can be a virtual private network (VPN). However, other suitable secure connections can be used for mobile location device 10 to communicate with the servers in data center 120. In some implementations, the communications between mobile location device 10 and servers in data center 120 are not secure. It should be appreciated that in some implementations, mobile location device 10 may also access other servers or endpoints that are in communication with mobile network 110. In some implementations, the system 5 may include a plurality of different mobile networks 110. In some implementations, the plurality of different mobile networks are located in different countries. In other implementations, some of the plurality of different mobile networks are located in the same country. In some implementations, mobile network 110 is a mobile virtual network (MVN). The mobile network 110 may be created as a virtual network that communicates over one or more other mobile networks. For example, the mobile network 110 may be formed using connectivity over a first GSM based mobile network and a second different GSM based mobile network. When a mobile location device 10 moves between a first GSM based mobile network and a second different GSM based mobile network, the transition and the data transmitted over the two different GSM based mobile networks is seamlessly routed to the same place (such as routed seamlessly through the cloud/Internet), creating a virtual mobile network.

Mobile location device 10 may communicate through mobile network 110 with the Internet 130. Mobile network 110 may have one or more links to the Internet 130, such as link 117, which permit mobile location device 10 to communicate with endpoints on the Internet 130. In some implementations, mobile location device 10 may access services from endpoints on the Internet 130 (not shown). For example, mobile location device 10 may access GPS correction data (also referred to as GNSS correction data) from a server accessible through the Internet 130. Mobile location device 10 may access other suitable services through Internet 130, such as for example, navigation guidance services for the visually impaired, which may include audio communications (e.g., instructions, cues, alerts, situational information and the like) which may be communicated to mobile location device 10 for audio presentation to pedestrian 20 via speaker 13. In some implementations, audio communications associated with navigation guidance services may be communicated to a user device associated with mobile location device 10, such as user device 140 for presentation to pedestrian 20. In some implementations, mobile location device 10 may comprise a short range communications link (not shown) to user device 140, such as a wireless Bluetooth communications link, a wired USB communications link, or some other suitable communications link, and audio communication may be communicated to mobile location device 10 and relayed to user device 140 for listening therethrough. In some implementations, mobile location device 10 may comprise a short range communications link (not shown) to user device 140, such as a wireless Bluetooth communications link, a wired USB communications link, an analog audio link or some other suitable link over which audio communication relating to navigation guidance services may be transmitted to an audio headset, earbud or the like. In some implementations, audio communications relating to navigation guidance services may be bidirectional where pedestrian 20 may request information from a navigation guidance service comprising natural language processing (NLP), for example pedestrian 20 may ask or request information such as, "is there a public restroom nearby", "how close am I to my destination", "what is my estimated time of arrival", etc. In some implementations, servers in data center 120 may also communicate with endpoints through Internet 130 via communication links 125.

Location system 5 also illustrates a user device 140. User device 140 may be a mobile phone, smartphone, electronic assistant device for the visually impaired or other suitable computer system, such as for example, a laptop computer, a tablet device or a smartwatch. In some implementations, the functions of the mobile location device 10 and the user device 140 can be integrated into one device. The user device 140 may be associated with the mobile location device 10, and the servers in data center 120 may store the association between the user device 140 and the mobile location device 10. The user device 140 may be in communication with one or more servers in data center 120 to access certain services. In some implementations, user device 140 may be configured with an application to access information about mobile location device 10 and various services, such as navigation services, navigational guidance services for the visually impaired, transportation payment (e.g., bus fare payment, light and heavy rail payment), and the like. User device 140 may communicate with a mobile network 160 through one or more cellular access points 150 via communication link 145. Cellular access points 150 may communicate with the mobile network 160 via one or more communication links 155. It should be appreciated that mobile network 160 may include hundreds or thousands of cellular access points 150 and communication links 145 to provide access to the mobile network 160. Through the mobile network 160, the user device 140 may communicate via communication link 165 with one or more servers in data center 120. A plurality of different data centers 120 may be used to provide services to user device 140. In some implementations, the mobile network 160 and mobile network 110 can be the same mobile network, depending on the geographic location of the mobile location device 10 and the user device 140, and service arrangements among the networks 110 and 160, and devices 10 and 140.

In various implementations, communication links noted herein can comprise hardwired or wireless communication links. It should be appreciated that not all communication links and network nodes used to form the illustrated communication links are shown in FIG. 1 or other figures.

It should be appreciated that methods of communications of system 5 are not limited to the various systems and networks shown in FIG. 1. Mobile location device 10 may be in communication with any other suitable number of networks and through any other suitable communication links.

Figure 2A:
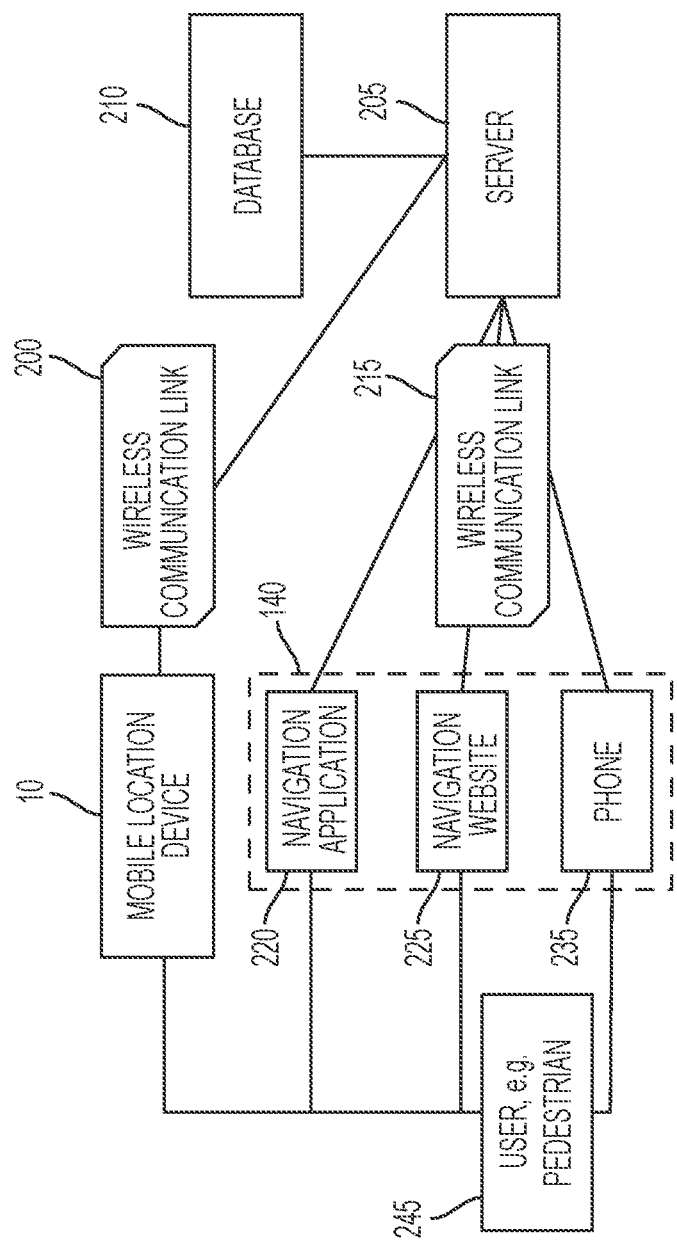
FIG. 2A is a block schematic diagram of the disclosed system and communication patterns between its different elements, including the mobile location device, the server (or multiple servers), the database (or multiple databases), and the pedestrian (through a mobile application or other means of communication) in some implementations.

FIG. 2A is a block schematic diagram illustrating some implementations of the high accuracy location system for pedestrian navigation services, pedestrian payment services, and possible links between its elements. The user, e.g., a pedestrian (which may be referred to as user/pedestrian 245), comprises (e.g., wears, carries, etc.) mobile location device 10 and may comprise user device 140. A database 210 may store geographical coordinates and navigation data associated with pedestrian routes, walkways, streets, street addresses, businesses, facilities, transportation access, and the like. In some implementations, the database 210 can be located in data center 120, or one or more data centers. In some implementations, database 210 can be stored on an external memory device of the mobile location device 10, such as a memory card (e.g., SD, micro SD, Compact Flash, etc.), USB flash drive, and the like, or directly in the internal memory of the processing device, such as flash memory within mobile location device 10. In some implementations, database 210 can be stored in a cloud data storage system and can be accessed from mobile location device 10. In some implementations, the database may contain geographic information (e.g., one or more geographical coordinates) defining a zone in terms of geolocated polygons, which may also be referred to as geolocated zones or geographical objects. In some implementations, such geographic zone information can be defined as a polygon or a center and radius of a circle. The data in database 210 can be derived from construction records, points of interest records, traditional surveying and the like. In some implementations, the information in database 210 can be derived at least in part from satellite view images and street view images. In some implementations, a zone can be encoded or associated with additional data specific to a particular transaction (e.g., light rail entry gate, bus stop). In some implementations, for a light rail entry gate geographic zone, the additional data may include, station name, station address, gate number, etc. In some implementations, database 210 may comprise geographical coordinates and data useful in navigational guidance services for pedestrians having visual impairment, such as obstacles, hazards and the like, and safe passageways, access to assistance and the like. It should be appreciated that the foregoing additional data descriptions are simply examples and the additional data can include fewer or more information to aid in pedestrian navigation and navigational guidance for the visually impaired as may be associated with a geographical objects and data.

In one implementation, the server 205 is a computer, either a physical machine or a virtual machine instance or several machines or virtual instances united together that may be housed in a data center such as data center 120 from FIG. 1. Communication links are provided between the server and other components of the system: the mobile location device 10, database 210, and the user/pedestrian 245 (via mobile location device 10 and/or user device 140) in some implementations. A communication link may be a wireless communication link, such as wireless communication link 200 between server 205 and mobile location device 10 and wireless communication link 215 between server 205 and user device 140, a hardware communication link, such as an ethernet link, or a suitable combination of both types of communications, such as for example, the combination of links 95, 105 and 115, the combination of links 95, 105, 117 and 125, or the combination of links 145, 155, 165 and 125 of FIG. 1. In the illustration of FIG. 2A, the mobile location device 10 communicates location data to the server 205. In some implementations, location data may include position data, e.g., longitude and latitude coordinate data. In some implementations, location data, may include such coordinate data and additional data such as inertial measurement sensor data (e.g., one or more of angular velocity, acceleration, and the like) and data related to the acquisition of location data, such as an indicator of received GNNS signal strength (e.g., carrier to noise density ratio-which may be abbreviated as CNO, CNO, C/No and the like), satellite system related data, source of motion data (e.g., GNSS module derived motion data, sensor readings and the like). In some implementations disclosed herein, a distinction between motion data derived from GNSS signals and not originating from inertial measurement sensors may be useful. For example, GNSS data may be a source of pedestrian speed which can be called GNSS derived speed, and be a form of GNSS derived motion data. GNSS derived velocity, for example can be a derivative of the GNSS acquired positions over time, or can be determined from Doppler frequency shifts produced by pedestrian motion relative to satellite positions. In contrast to GNSS derived motion data, inertial measurement sensor motion data is acquired using inertial measurement sensors used by a MEMS inertial measurement unit processor, e.g., accelerometers, gyroscopes, magnetometers and the like. Inertial measurement sensor motion data may also be referred to herein as non-GNSS motion data. In some implementations, communication of location data may occur on every location point determined by mobile location device 10, or some other data point interval or time interval (e.g., every other data point, every fifth data point, every 1 second, every 5 seconds, etc.). In some implementations, such communication may be based on a query received by the mobile location device 10 for a current location, wherein a query response may comprise one or more location data points (e.g., 5 data points, 10 data points, etc.). In some implementations, such communication may result from the occurrence of a trigger event, such as a detected pedestrian speed of zero indicating a stopped condition, a detected pedestrian speed below a predetermined speed threshold value, or a detected pedestrian speed above a certain threshold. In some implementations, a combination of intervals, queries, trigger events and/or detected conditions may be used to initiate communication of location data. Upon receiving location data from mobile location device 10, server 205 may connect to the database 210 to retrieve relevant information about geographical objects/geographic zones, geographical coordinates and navigation data associated with pedestrian routes, walkways, streets, street addresses, businesses, facilities, transportation access, and the like which may be associated with received location data point(s).

In some implementations, a user/pedestrian 245 can install a navigation application 220 on their user device 140. In some implementations, navigation application 220 may be configured to display a map or map related data received from server 205, such as a navigation map relating to a current location of user/pedestrian 245. In some implementations, navigation application 220 may be configured to receive audio generated by server, wherein such audio comprises navigational guidance related to a current location of user/pedestrian 245. In some implementations, the server 205 may be configured to receive and interpret spoken words from the user/pedestrian 245 via navigation application 220, wherein in some implementations, server 205 may comprise natural language processing capabilities. The user/pedestrian 245 can configure an account associated with the user/pedestrian 245 to configure and maintain application settings such as a list of starting locations, a list of destinations, preferences (e.g., locations to avoid), special needs (e.g., audio guidance for the visually impaired), associated devices (e.g., mobile location device 10), notifications (e.g., construction alerts, weather alerts, recommended changes to route, etc.) to be received through the navigation application 220 or other notification mechanisms via communication links 215. Communications link 215 may be a combination of a wireless communication link and a hardware communication link, such as for example, the combination of links 145, 155, 165 and 125 of FIG. 1. In some implementations, the notification mechanism may be notifications via the installed navigation application 220. In some implementations, the notification mechanism may include notifications from a navigation website 225, short message service (SMS) text 235, or other suitable means. It should therefore be appreciated that in some implementations, the user/pedestrian 245 is able to customize the navigation sessions and communication settings. Additionally, in some implementations, a user may be able to configure a navigation application 220 or other applications comprised by user device 140 or mobile location device 10, or a server 205 based application to facilitate a transaction and/or payment for a transaction, such as a registering a transportation services transaction and/or payment therefor (e.g. a bus transportation transaction and/or payment therefor). A transaction may include purchasing other suitable goods and services based on the user's determined location using some combination of the mobile location device 10, the user device 140, and/or the server 205.

Figure 2B:
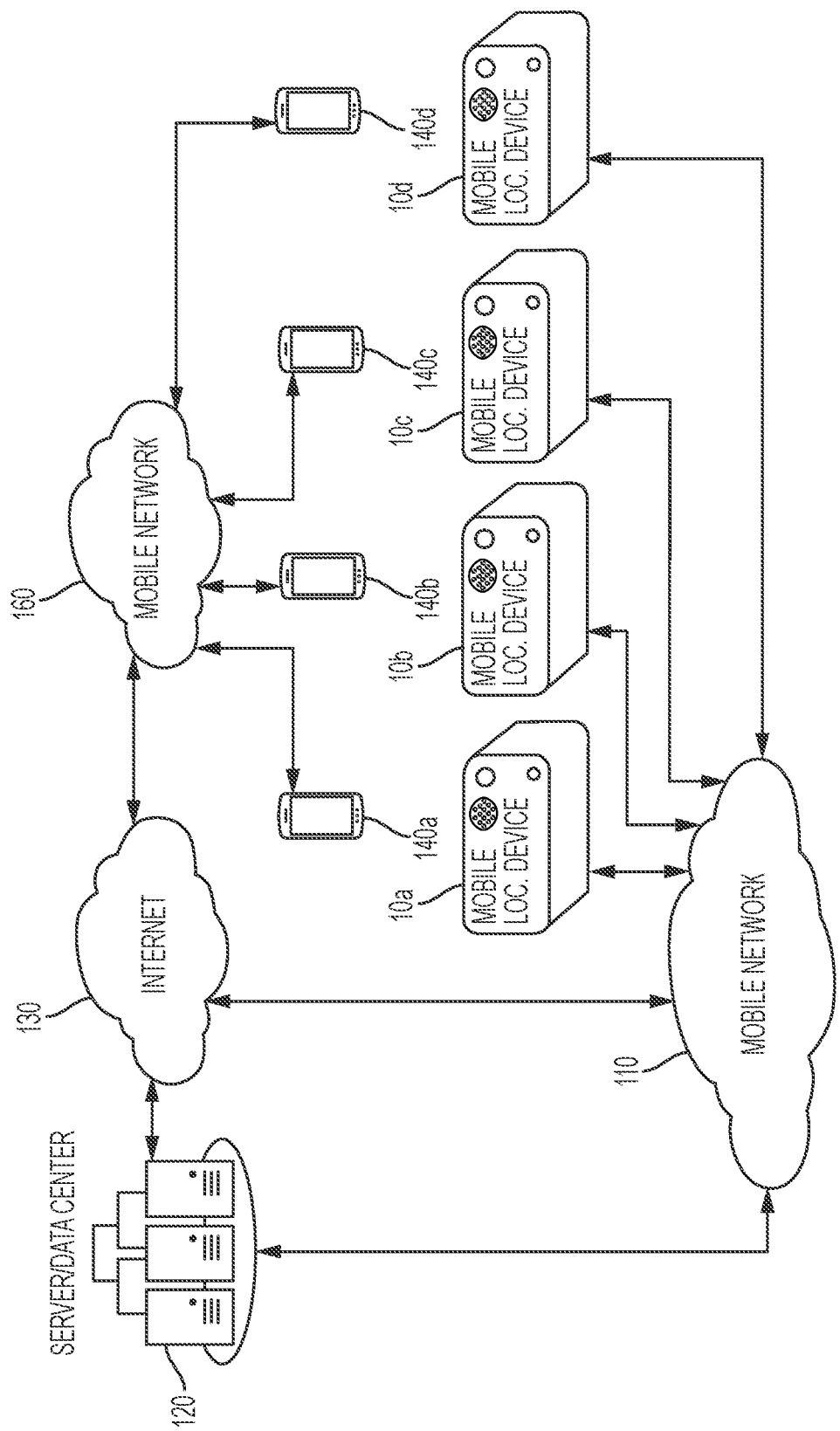
FIG. 2B is a block diagram of some implementations of the various systems and methods further illustrating a plurality of mobile location devices and a plurality of user devices.

FIG. 2B is a block diagram of some implementations of the various systems and methods illustrating a plurality of mobile location devices and a plurality of user devices. The system elements of the mobile network 110, the data center 120, Internet 130, and the mobile network 160 and the lines or links of communication between them are the same or similar to the system elements discussed above in FIG. 1. FIG. 2B illustrates a plurality of mobile location devices, such as mobile location device 10a, mobile location device 10b, mobile location device 10c, and mobile location device 10d operating within the system. These mobile location devices 10a-10d are each the same or similar to the mobile location device 10 described above. It should be appreciated that the system illustrated in FIG. 2B may support any suitable number of additional mobile location devices 10a-10d. In some implementations, a higher saturation of mobile location devices in any given geographic region provides better information to the servers in data center 120. This in turn enables the servers in data center 120 to provide better information to the mobile location devices and elements in the system (e.g., mobile location devices 10a-10d and user devices 140a-140d). In some implementations having a plurality of different mobile networks 110, at least one of the mobile location devices 10a-10d may be in communication with one of the different mobile networks. For example, mobile location device 10a may be located in the United States and in communication with a mobile network 110 located in the United States. Whereas, mobile location device 10d may be located in Japan and may be in communication with a different mobile network.

FIG. 2B illustrates user device 140a, user device 140b, user device 140c, and user device 140d. These user devices 140a-140d are each the same or similar to the user device 140 described above. It should be appreciated that the system illustrated in FIG. 2B may support any suitable number of additional user devices 140a-140d. Like user device 140, each user device 140a-140d may be associated with one of the mobile location devices 10a-10d, and each pair of a mobile location device and an associated user device may be associated with a user (a pedestrian), wherein these associations can be stored in a server or database in data center 120. As noted above, in some implementations the functions of a mobile location device and a user device may be integrated into one device. For example, mobile location device 10a and user device 140a may be combined into one device useable as a pedestrian location and navigation device, as may be one or more of mobile location devices 10b-10d and their associated user device of user devices 140b-140d.

Figure 3:
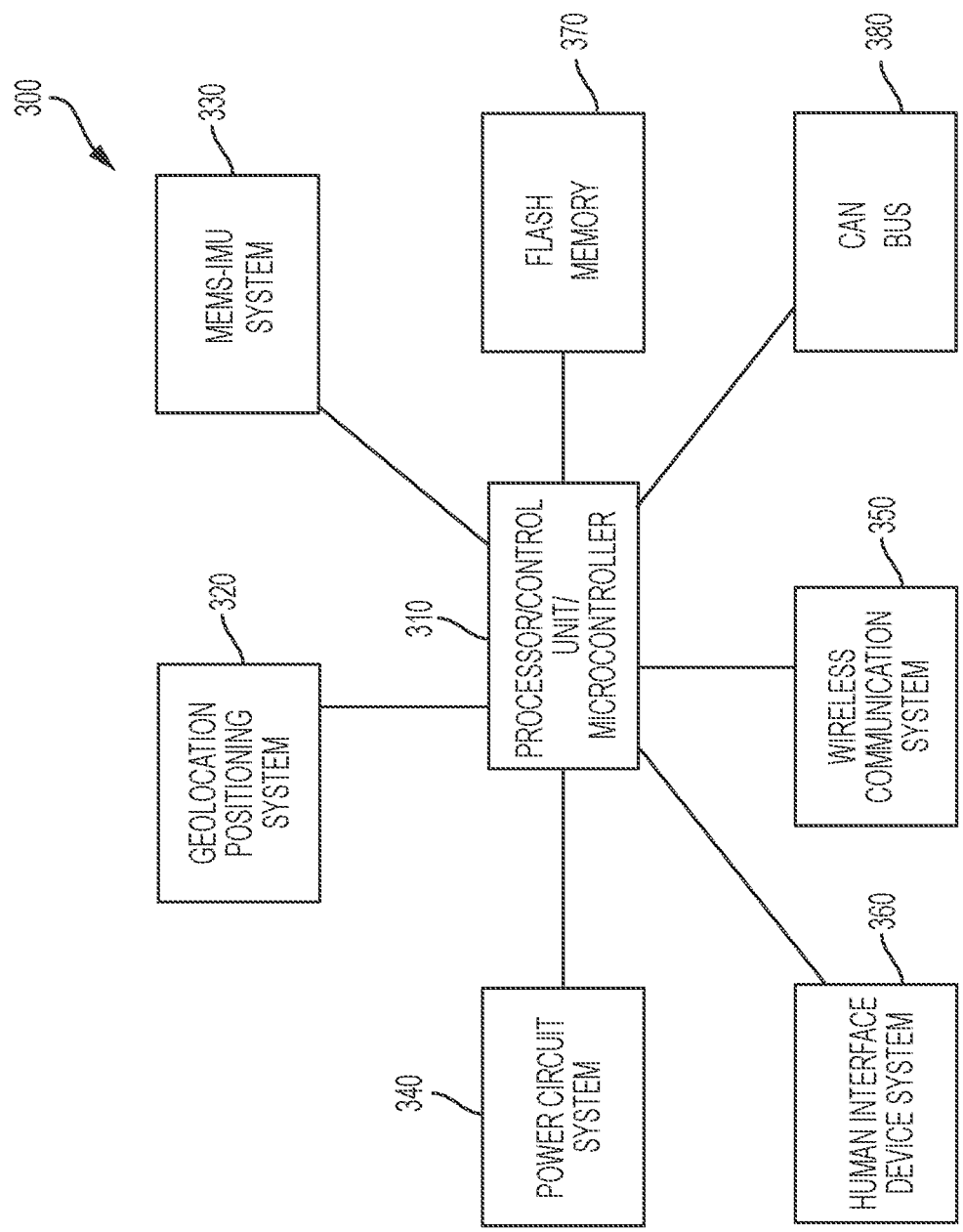
FIG. 3 is block diagram illustrating some implementations of elements contained in a mobile location device.

Turning now to FIG. 3, the block diagram illustrates system 300, which comprises subcomponents of a mobile location device 10 in some implementations. In some implementations, the mobile location device 10 includes at least one processor/control unit/microcontroller 310. Processor 310 may be an application specific integrated circuit (ASIC) or a general purpose processor. The processor 310 is in direct or indirect communication with a plurality of other components shown in FIG. 3 that enable the mobile location device 10 to detect its position or location with a high degree of accuracy. Processor 310 may coordinate the functions of other modules described herein. Processor 310 may further execute algorithms to increase accuracy of geolocation positioning, and provide timely communication between the mobile location device and one or more servers.

In some implementations, the mobile location device 10 includes a geolocation positioning system 320, which is used to determine the location of the mobile location device 10 (and the pedestrian 20 possessing the mobile location device 10) at any given point in time and any geographical context. The geolocation positioning system 320 is in communication with processor 310. The geolocation positioning system 320 may comprise a custom processor that can receive and process satellite signals, such as global navigation satellite system (GNSS) signals (e.g., GPS, GLONASS, Galileo, etc.). The geolocation positioning system 320 may further include an antenna, amplifiers, signal filters, and the like, to effectively process received GNSS signals. The geolocation positioning system 320 transmits GNSS signals to processor 310 for further processing. In some implementations, the geolocation positioning system 320 comprises a reduced feature set to make the geolocation positioning system 320 affordable and functional for use in consumer devices. For example, in some implementations, the geolocation positioning system 320 lacks the ability to process raw GNSS data. In some implementations, the geolocation positioning system 320 may lack the ability to reduce or eliminate the effects of multipath signal distortion on its own. When a reduced feature set geolocation positioning system 320 is used, the reduced feature set may prevent the geolocation positioning system 320 from performing adequately in some areas such as dense urban areas. For example, pedestrian 20 with mobile location device 10 (including a reduced feature set geolocation positioning system 320) can be located at a first bus stop adjacent to a second bus stop, yet the reduced feature set geolocation positioning system 320 might erroneously determine its location as the second bus stop, or no bus stop at all, due to multipath signal distortion. Even a more expensive GNSS processor may not be able to mitigate against multipath signal distortion on their own. However, when the geolocation positioning system 320 is configured with certain other systems and features discussed below, the geolocation positioning system 320 provides high accuracy location detection despite the reduced feature set of geolocation positioning system 320. The reduced feature set also enables the geolocation positioning system 320 to use less power in operation.

In some implementations, various solutions can be adopted to help provide the desired positioning or location accuracy for mobile location device 10 with GNSS corrections data. For example, a differential GPS system assisted by the data received from the continuously operating reference stations (CORS), such as the one described in U.S. Pat. No. 5,490,073 (which is hereby incorporated by reference in its entirety), can provide help determining positioning in a dense urban environment. At present, there are several publicly operating CORS networks in the United States, such as NYSnet in the state of New York. The data from the CORS network can be obtained by the geolocation positioning system 320 in the mobile location device 10 via established protocols, such as the RTCM 10403.1 standard or other suitable standards. In some implementations, real-time kinematics data and raw data from the receiver are used to evaluate pseudo ranges and other variables in a custom algorithm that can be implemented in an ASIC or software, to determine a more precise location of the mobile location device 10 (and pedestrian 20).

In some implementations, system 300 further includes MEMS-IMU system 330. The processor 310 is in communication with the MEMS-IMU system 330, wherein MEMS-IMU system 330 is an inertial measurement unit (IMU) that comprises one or more accelerometer sensors and one or more gyroscope sensors. The MEMS-IMU system 330 can measure linear and angular motion of the mobile location device 10. In some implementations, the MEMS-IMU system 330 further comprises a magnetometer. The MEMS-IMU system 330 may comprise other suitable sensors. When processor 310 combines data from geolocation positioning system 320 and the MEMS-IMU system 330, the processor 310 can more accurately determine the position of the mobile location device 10 and thereby a pedestrian possessing the mobile location device 10. This increased accuracy assists in providing accurate pedestrian navigation services and accurate navigational guidance services for the visually impaired while, in some implementations, using a reduced feature set geolocation positioning system 320. In some implementations, when the geolocation positioning system 320 is not operating properly (e.g., it cannot receive satellite signals when under a bridge or in a building), data from the MEMS-IMU system 330 may augment or supplant data from the geolocation positioning system 320 to assist in establishing a pedestrian's location for pedestrian navigation services and navigational guidance services for the visually impaired. In some implementations, system 300 of mobile location device 10 may not include a MEMS system 330. In some implementations, MEMS system 330 may be included in mobile device (e.g., user device 140), wherein processor 310 may communicate and receive MEMS data from such mobile device (not shown), such as a MEMS system that may be included in a mobile phone.

In some implementations, processor 310, or an AISC or processor not shown, may be configured to comprise an estimation filter, such as a Kalman filter, wherein such a filter is configured to determine and maintain a predictive location estimation model estimating a current position based on an input stream of data received from a GNSS module and MEMS-IMU system. In some implementations, as will be described later herein, a novel constant heading, constant velocity/speed dual mode Kalman filter comprising a standing mode and a walking mode may be used.

In some implementations, system 300 further includes a power circuit system 340. The power circuit system 340 may include one or more batteries, a charging port, an electrical outlet, and a power management integrated circuit. The power circuit system 340 supplies power to the various components of system 300 in mobile location device 10. In some implementations, power circuit system 340 monitors power reserves and communicates with processor 310 to determine when to reduce operations of certain system 300 components or enter sleep mode to conserve power, or when to shut down mobile location device 10. In some implementations, the mobile location device 10 uses the battery to keep some operational information in buffers to enable the mobile location device quickly start (instead of a cold start where the mobile location device 10 may have to go through a longer boot/initialization procedure to be usable or return to a fully operational mode). In some implementations, mobile location device 10 configured with an estimation filter, may use the battery to maintain the predictive location estimation model therein. In some implementations, the mobile location device 10 includes a second battery to maintain satellite almanac information in RAM buffers. This enables the mobile location device 10 to start without having to reestablish the Time To First Fix with the satellites. In some implementations, mobile location device 10 may comprise flash memory 370, wherein a maintaining of RAM buffers and a predictive estimation model may be offloaded thereto such that circuitry otherwise needed to maintain such information and state related data may be powered down or minimally powered and battery power consumption may be further reduced. In some implementations, mobile location device 10 may comprise a can bus system 380.

In some implementations, system 300 further includes a wireless communication system 350. Wireless communication system 350 provides a communication link between the mobile location device 10 and at least one server (through the communications links discussed herein). The wireless communication system 350 may include a cellular data processor, an antenna, a SIM card (and/or eSIM functionality), and other components necessary to communicate with mobile networks, like mobile network 110. In some implementations, communications from processor 310 to the server (through mobile network 110) follows a predefined protocol and can be established, for example, through Internet connections based on HTTP protocols and the HTTPS extension protocols (e.g., GET and POST request methods), through a protected Virtual Private Network (VPN), or a combination of both. For example, mobile location device 10 and a server in data center 120 can be connected via a VPN tunnel created using the processor 310 in communication with wireless communication system 350. In some implementations, the connection can be constantly refreshed and the messages reach both destinations (mobile location device 10 and the server) through open sockets.

In some implementations, system 300 further includes a human interface device system (HID) 360. The HID 360 may include one or more buttons that the user can press. The HID 360 may include one or more LED lights that can provide the user with useful system status information. In some implementations, HID 360 includes a screen capable of generating and displaying messages to the user (e.g., reporting battery life, reporting system status, reporting pedestrian navigation information, etc.). In some implementations, the HID 360 comprises an audio speaker for communicating navigational guidance information. The HID 360 communicates with processor 310 to receive user input or to provide the user with information.

Figure 4:
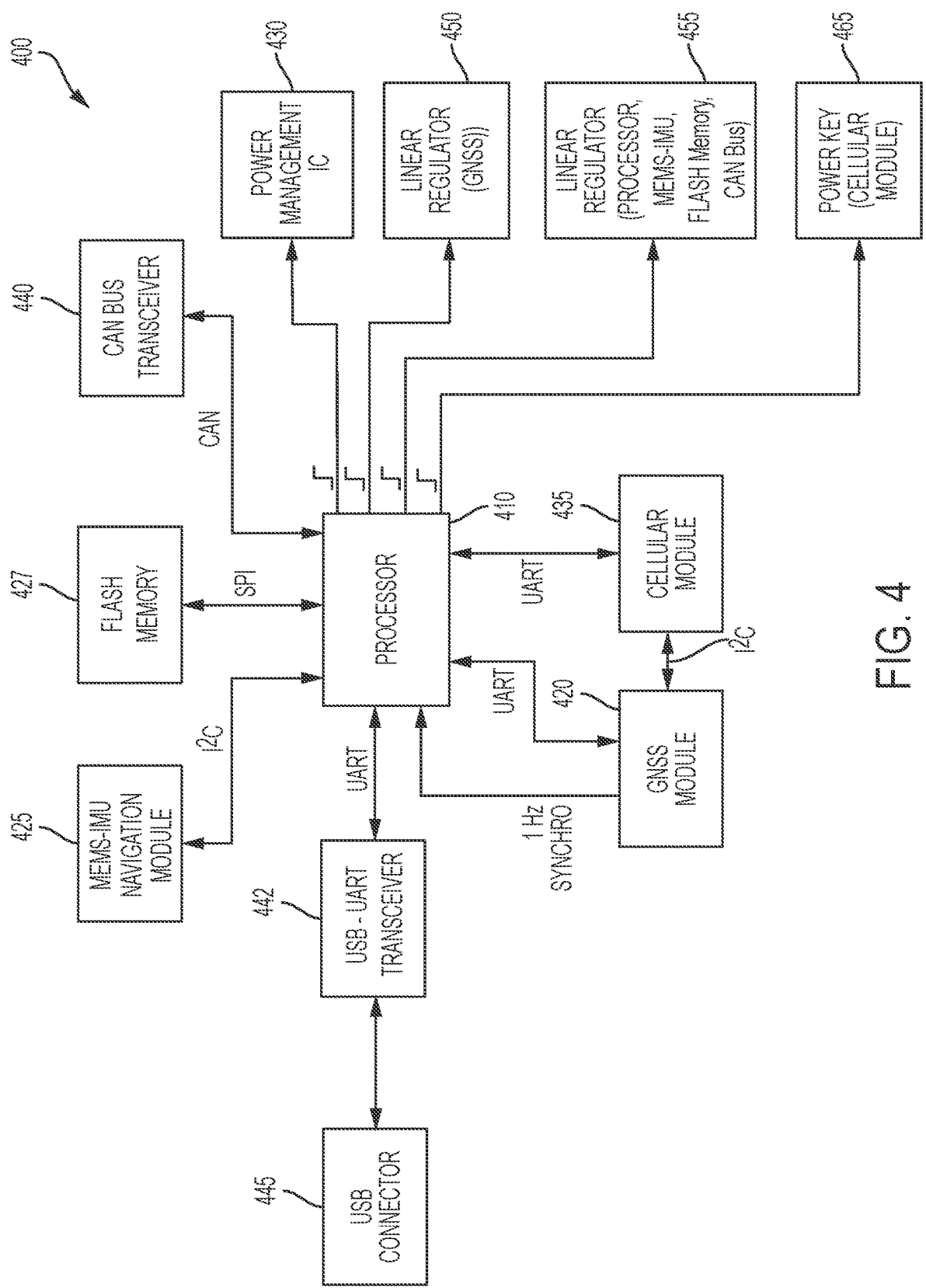
FIG. 4 is a block diagram illustrating some implementations of the signaling between components of the mobile location device.
Figure 5:
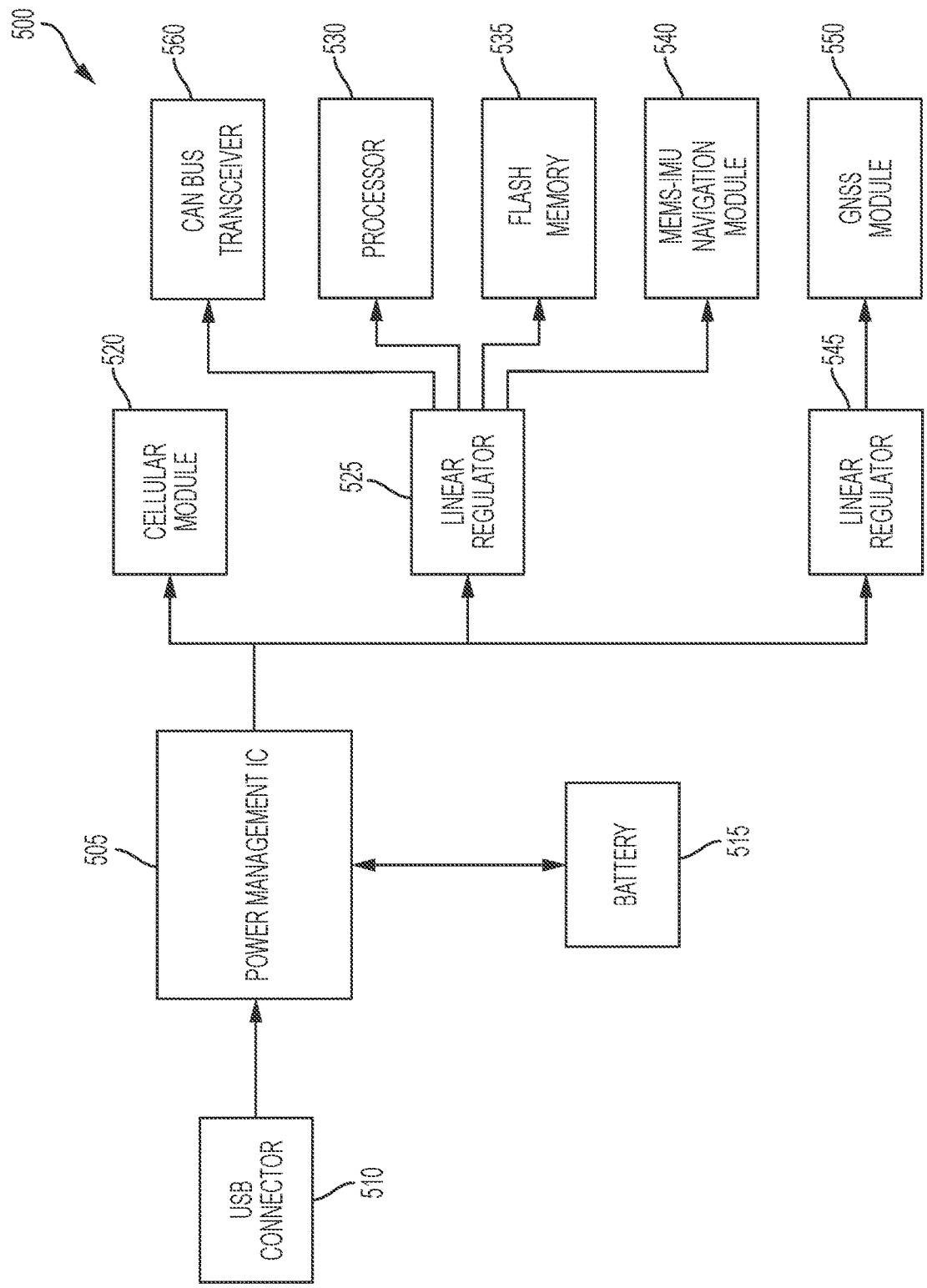
FIG. 5 is a block diagram illustrating some implementations of the connections between the power subsystems of the mobile location device.
Figure 6:
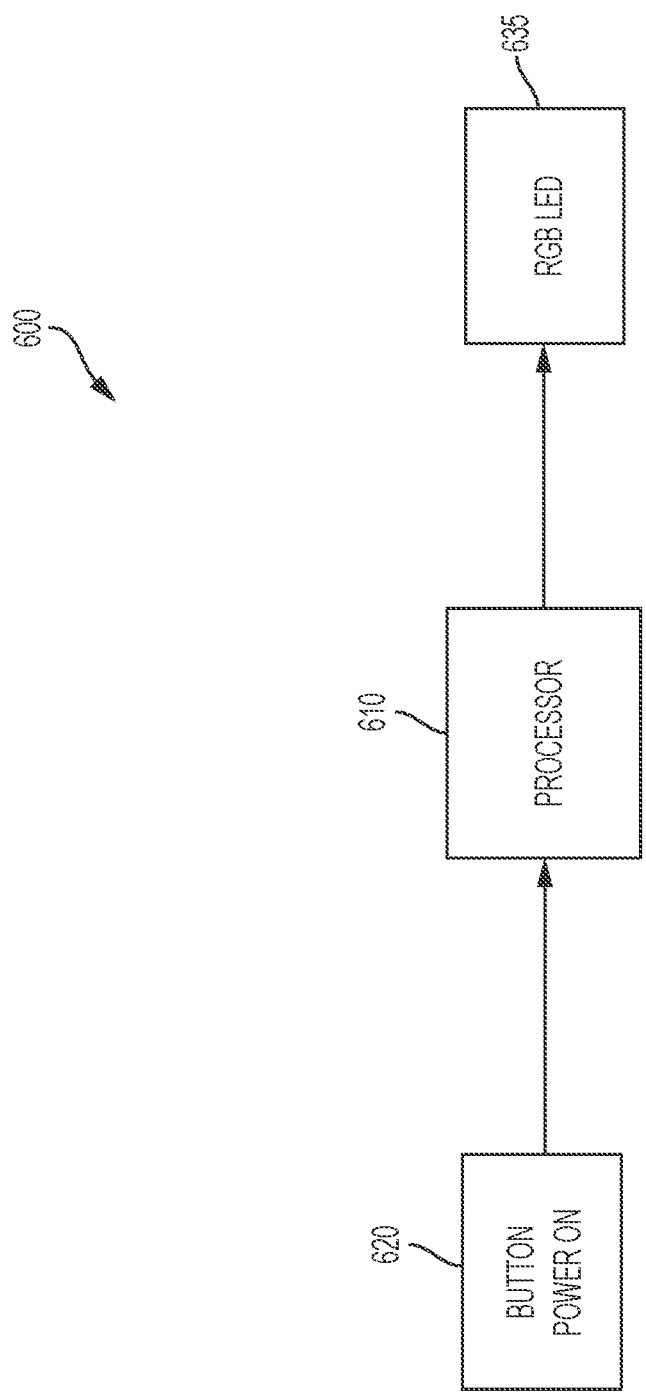
FIG. 6 is a block diagram illustrating some implementations of the connections between the human interface device subsystem of the mobile location device.

In some implementations, system 300 further includes a controller area network (CAN) bus which may facilitate cost effective, high reliability communications among devices and systems external to mobile location device 10 such as a test and configuration system, or as a multidrop link to simplify connectivity circuitry between various components and systems internal to mobile location device 10. FIGS. 4, 5, and 6 are block diagrams that illustrate more detail regarding some of the possible components of system 300 in mobile location device 10 of some implementations, which were also discussed in connection with FIG. 3. It should be appreciated that in some implementations, mobile location device 10 may have more components or few components than are shown or described herein.

Turning now to FIG. 4, some implementations of the signaling between certain components of system 400 of the mobile location device 10 are illustrated. As noted in FIG. 3, the processor 410 (also shown as processor 310 in FIG. 3) is in communication with a plurality of different components. In various implementations, processor 410 manages power, collects, and uses information from the different modules illustrated in FIG. 4. The processor 410 is in communication with GNSS module 420 (which is a component of geolocation positioning system 320) via universal asynchronous receiver-transmitter (UART). Information about coordinates from the GNSS module 420 are transmitted to the processor 410 via UART. The GNSS module 420 may generate a 1 Hz pulse and transmit the 1 Hz pulse to the processor 410 in some implementations. In some implementations, the 1 Hz pulse may be used to synchronize data from the different modules or components that communicate with processor 410.

Also illustrated are a MEMS-IMU navigation module 425 (which is a component of MEMS-IMU system 330 in FIG. 3) and cellular module 435 (which is a component of wireless communications system 350 in FIG. 3). The MEMS-IMU Navigation module 425 communicates with the processor 410 via Inter-Integrated Circuit ($I^2C$) while cellular module 435 communicates with processor 410 via UART. It should be appreciated that the modules described herein may communicate with processor 410 using any suitable method. For example, the MEMS-IMU Navigation module 425 transmits inertial measurement data via $I^2C$ to processor 410, which can be used to help correct the coordinates data that processor 410 obtains from the GNSS module 420, and in some implementations may be used to determine a velocity and a heading. Processor 410 transmits data via UART to cellular module 435, through which the mobile location device 10 communicates with a server to transmit the current state of the mobile location device 10 such as mobile location device 10's coordinates and status. In some implementations, GNSS module 420 can communicate with the cellular module 435 via $I^2C$ to supply the GNSS module 420 with GNSS corrections data. In some implementations, firmware on mobile location device 10 (which may be comprised by flash memory 427) may be updated through the cellular module 435 in communication with processor 410 (and in turn processor 410 may update flash memory 427 via a serial peripheral interface, SPI). In some implementations, a CAN interface and CAN bus transceiver 440 may be used as a multidrop interface for communicating among a plurality of modules and devices as an alternative to $I^2C$, UART and/or SPI and facilitate inter-module communications.

USB connector 445 is illustrated as connected to a USB-UART transceiver 442 and in turn to the processor 410 via a UART interface. In some implementations, mobile location device 10 may not include a USB connector 445. In some implementations, mobile location device 10 includes other types of suitable connectors, such as a CAN bus connector, not shown, for external connection to CAN bus transceiver 440. In various implementations, USB connector 445 (or, in some implementations, a CAN bus connector, not shown) can be used to power the mobile location device 10, charge batteries in mobile location device 10, and update firmware on mobile location device 10.

The power management IC 430 (which is a component of power circuit system 340 in FIG. 3), linear regulator 450, linear regulator 455, and a Power Key 465 are in communication with processor 410. Processor 410 can control, using logic levels, the power of the device as well as power to different components illustrated in FIG. 4 in some implementations. For example, processor 410 can turn off the entire mobile location device 10, or turn off output of the power linear regulators 450 and 455, to GNSS module 420, and MEMS-IMU module 425, flash memory 427, and CAN bus transceiver 440, respectively (the power connections between the modules are illustrated in FIG. 5). In some implementations, more than the depicted two linear regulators may be configured to provide more granularity in which components may be powered or not powered, or fewer linear regulators may be configured providing less granularity in which components may be powered or not powered. Processor 410 can also turn off the cellular module 435 by sending logic level signal to the Power Key 465 in some implementations. In some implementations, the ability to selectively shut down the different modules creates a very power efficient device.

It should be appreciated that in some implementations, the components described in connection with FIG. 4 are not used or may be substituted with different components. FIG. 4 may have more components or fewer components.

FIG. 5 illustrates a block diagram of some implementations of a power circuit system 500 (which corresponds to power circuit system 340 in FIG. 3) showing power supply interconnections. In one implementation, the center of the power supply is a power management integrated circuit (IC) 505 that is configured to receive power from both the USB connector 510 (which corresponds to USB connector 445 in FIG. 4) and the battery 515 and dynamically switch between the two power supplies. In some implementations, if the USB connector 510 is used for power, power management IC 505 causes the battery to be charged. In the illustrated implementations, cellular module 520 (which corresponds to cellular module 435 in FIG. 4) is fed directly from power management IC 505. The other illustrated modules processor 530, MEMS-IMU navigation module 540, GNSS module 550, can bus transceiver 560, and flash memory module 535 are all powered via LDO (Low Dropout) linear regulator 525 and 545. As noted above, the modules in FIG. 5 correspond to modules discussed above in FIG. 4, which are components of the systems discussed in FIG. 3. As also noted above in connection with FIG. 4, this configuration enables processor 410 to control power supplied to the various modules to ensure efficient use of power. For example, processor 410 can shut down GNSS module 550 where processor 410 determines that the mobile location device 10 is in a location where no GNSS signals can be received (e.g., inside a building, under a bridge, etc.). Processor 410 can be configured to selectively shut down different modules under different triggering conditions to ensure maximum battery life or most efficient power consumption of the mobile location device 10. Triggering events may include events such as the expiration of timers after a standing condition is detected by MEMS-IMU data and/or GNSS data.

It should be appreciated that in some implementations, the components described in connection with FIG. 5 are not used or may be substituted with different components. FIG. 5 may have more components or fewer components.

FIG. 6 illustrates a block diagram of some implementations of a human interface device (HID) system 600 (which corresponds to HID 360 in FIG. 3) showing human input and feedback mechanisms of mobile location device 10. In the illustrated implementations, processor 610 (corresponding to the processor 310, 410, etc.) is connected to button 620 and LED 635. It should be appreciated that fewer buttons or more buttons can be added to mobile location device 10. In some implementations, a plurality of LED lights are used to supply information to a user of mobile location device 10. In some implementations, a display screen may be included in addition to or in place of the LED 635. In some implementations, an audio speaker (not shown in FIG. 6) may be included, wherein information such as navigational guidance and other information (system status, etc.) may be communicated using audio. In the illustrated implementations of FIG. 6, button 620 is associated with turning the power on to mobile location device 10. In some implementations, buttons may be configured to trigger any suitable function and one or more buttons may be associated with a plurality of different functions. In some implementations, LED 635 may provide information status to a user in a variety of different ways. In some implementations, LED 635 may illuminate a particular color when the device is powered on, illuminate a different color when a test is running, illuminate yet a different color when a reset is in process. In some implementations, the processor 610 may cause the LED 635 to flash in different patterns to alert the user of different events (e.g., communication mode, low battery mode, charging mode, error conditions, etc.).

It should be appreciated that in some implementations, the components described in connection with FIG. 6 are not used or may be substituted with different components. FIG. 6 may have more components or fewer components.

Turning now to the operations of mobile location device 10, as noted above, mobile location device 10 can be configured with different GNSS modules which can produce a variety of levels of coordinate accuracy. As noted above, some uses of location or positioning data require a high degree of accuracy. For example, some require positioning accuracy of approximately four meters or less. Obtaining this level of accuracy can be difficult in certain situations, like dense urban setting, whether using expensive GNSS modules or less expensive GNSS modules. Obtaining usable GNSS data in dense urban setting introduces a number of challenges. High buildings in "urban canyons" can completely block GNSS signals from a number of satellites which results in poor satellite geometry. Walking under structures and through buildings may obstruct GNSS signals. GNSS signals can be reflected by various surfaces which leads to the non-line-of-sight (NLOS) GNSS signal reception as well as the multipath contamination of GNSS signals. When walking below a threshold speed (e.g., 2 km/hour, 2.5 km/hour or some other suitable low speed), GNSS signals may also suffer from drift errors (e.g., the GNSS signals indicate positions nearby that are other than the actual position of a pedestrian). Average walking speeds for sighted persons (which may be roughly about 4 km/hour) may be prone to drift errors. Average walking speeds for the visually impaired, which may be considerably slower and accordingly considerably more prone to drift errors. Furthermore, when a pedestrian is standing, drift errors may be considerable. Many GNSS modules and systems (e.g., GNSS receivers and antennas) are vulnerable to the aforementioned effects. The aforementioned effects can result in long position detection convergence times and coordinate jumps of more than 10 meters. Some high end GNSS receivers are configured to mitigate some of the impact of the above mentioned negative effects on a hardware level. However, such high end GNSS receivers are extremely expensive, extremely large, require high energy consumption, and still suffer from the same issues. These high end GNSS receivers are unavailable for mass-market platforms due to the high cost, unacceptable physical sizes, and high energy consumptions of these devices. Moreover, in a dense urban setting or a pedestrian walking into or under structures, even high end GNSS receivers are often not capable of overcoming issues derived from poor satellite geometry, NLOS signals reception, multipath effects, and low speed drift effects, to provide coordinates output of a sufficient integrity (e.g., approximately four meters of less) to be useful for location systems that require high accuracy position detection. Furthermore, a desired accuracy for navigational guidance services for the visually impaired may require location accuracies on the order of one meter or even a fraction of a meter.

Thus, a need exists for a high accuracy (e.g., four meters or less) location (or position) detection system usable for pedestrian navigation systems that can use inexpensive, low end GNSS receivers. Furthermore, in navigational guidance systems for the visually impaired, a need exists for a high accuracy (e.g., one meter or less) location (or position) detection system, wherein a higher cost, a larger size and higher power consumption may be an acceptable tradeoff towards increased accuracy. As will be discussed in FIG. 7 and FIG. 8, the disclosure herein details a high accuracy location (or position) detection system that can use inexpensive GNSS receivers, wherein using an estimation filter as disclosed, a high accuracy location detection of approximately four meters or less may be achieved, yet the detection system may be low in cost, small in size, and low in energy consumption. Furthermore, the same novel techniques and estimation filter disclosed herein may be used with a higher end GNSS receiver to achieve a high accuracy location detection of approximately one meter or less.

Figure 7:
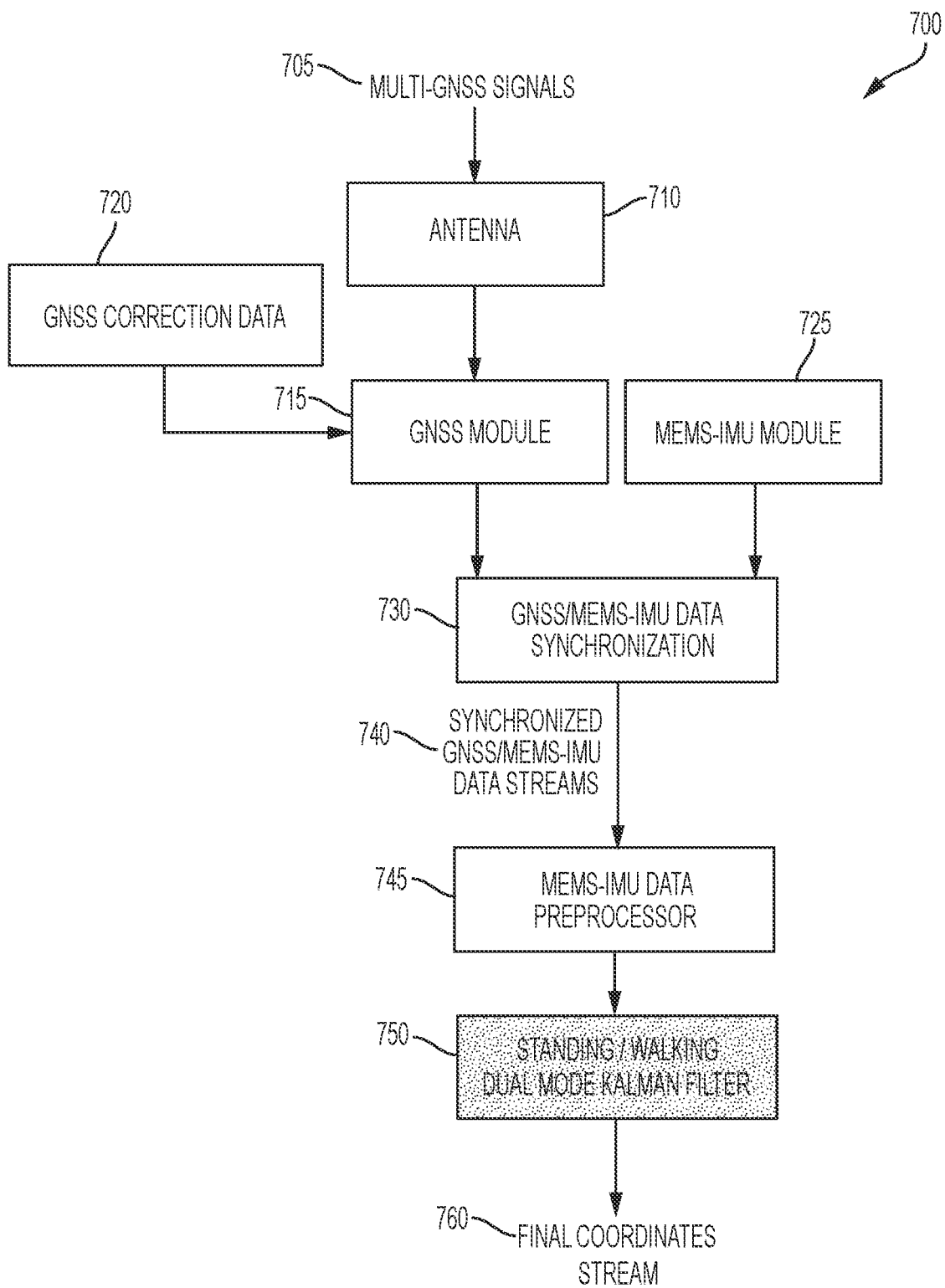
FIG. 7 is a flowchart illustrating some implementations of the signal processing paths of location data in the mobile location device.

FIG. 7 is a flowchart of some implementations illustrating signal processing paths of process 700 that obtains location data streams at the mobile location device 10. One or more processors in mobile location device 10 will convert the location data streams into high accuracy location data associated with the mobile location device 10. In some implementations, mobile location device 10 obtains location data streams from a plurality of sources. The sources may include GNSS signals 705 from satellites such as GPS and GLONASS, GNSS corrections data 720, and inertial sensor data of embedded MEMS-IMU data module 725 in which pedestrian motion data may originate as shown in FIG. 4 which depicts MEMS-IMU Navigation module 425 of mobile location device 10. The MEMS-IMU module can be used to provide pedestrian speed or velocity (and directional changes) derived from accelerometer data and yaw rate from a gyroscope, and the MEMS-IMU provided pedestrian velocity data can be used as an alternative to GNSS derived velocity data from the GNSS data. In some implementations, mobile location device 10 may also obtain GIS data (not shown). Mobile location device 10 may obtain other suitable data input streams in some implementations. It should be appreciated, that some or all of the location data input streams illustrated in FIG. 7 may not be used or obtained in some implementations. When available and as needed, GNSS module 715 obtains GNSS signals 705 from available satellites through an antenna 710. The GNSS signals 705 may include information such as, but not limited to: GPS timestamp; latitude, longitude, height; solution status; ground speed; and azimuth.

In some implementations, the GNSS module 715 may also obtain GNSS correction data 720, although this is not required. While not shown, in some implementations, GNSS correction data 720 may be obtained from a processor such as processor 310 of the mobile location device 10. Processor 310 may obtain such GNSS correction data 720 via a server in data center 120 or a server connected to Internet 130 through mobile network 110. In some implementations, GNSS correction data 720 may be received from other sources such as fixed ground-based reference stations. The GNSS correction data 720 may include differential GPS data, ephemeris, almanac, accurate time, satellite status, and any other suitable data points. As will be discussed further below, a processor of the mobile location device 10 (e.g., processor 310) may apply the GNSS correction data 720 to received GNSS signals 705 to calculate and determine more precise GNSS location data of mobile location device 10.

MEMS-IMU data module 725 (which corresponds to MEMS-IMU system 330 and MEMS-IMU Navigation module 425) includes sensors such as an accelerometer and a gyroscope, and may include at least three distinct channels of each measurement to obtain inertial motion data in 3 dimensions. In some implementations, as noted above, the acceleration provided by the MEMS-IMU system 330 can be used to calculate a pedestrian's velocity that is non-GNSS derived velocity. In some implementations, the calculated pedestrian velocity can be used as the velocity information provided to the dual mode Kalman filter described below. In some implementations, the calculated pedestrian velocity from the MEMS-IMU system 330 is provided to the dual mode Kalman filter and used in place of GNSS derived velocity information obtained from the GNSS module (e.g., when GNSS data cannot be trusted because the GNSS data has a high associated level uncertainty—as can be determined from CNO data).

The GNSS module 715 and the MEMS-IMU data module 725 transmit their data to the GNSS/MEMS-IMU data synchronization block 730, which synchronizes the data streams. Synchronized GNSS/MEMS-IMU data streams 740 may be processed prior to being input to an estimation filter (i.e., "preprocessed"), such as a Kalman filter 750, wherein preprocessed synchronized GNSS/MEMS-IMU data streams may be input to the estimation filter, such as Kalman filter 750 which can estimate a final set of coordinate data 760. It should be appreciated that final in reference to the final set of coordinate data 760 is not final in the sense that additional coordinate data is not generated. In some implementations, the estimation filter continuously generates coordinate data. In some implementations, the data (e.g., the preprocessed synchronized GNSS/MEMS-IMU data streams) fed to the estimation filter, like the Kalman filter 750, may be assigned a weight or trust value, which the estimation filter can use to determine how the data will be used to generate the coordinate data. As trust in the data decreases, the estimation filter may rely less on the provided data to generate coordinate data. For example, a MEMS-IMU data preprocessor 745 may determine a variance position measurement value (VPMV) based on the CNO data obtained from the received GNSS data. As the CNO value is decreased, the VPMV value may increase along a particular scale. In some implementations, the VPMV is provided to the estimation filter along with the GNSS data. As the VPMV value increases for the GNSS data, the estimation filter may rely less on the GNSS data and more on the MEMS-IMU data to generate coordinate data. In some implementations, for example, where the CNO value for GNSS data is below a predetermined threshold (e.g., 20 or some other suitable number), the MEMS-IMU data preprocessor 745 may determine a VPMV value for the GNSS data that is so high that the estimation filter may substantially disregard the GNSS data when generating the coordinate data.

In some implementations where the GNSS data is substantially disregarded, for example, the MEMS-IMU data preprocessor 745 can determine whether to use velocity data from GNSS data (GNSS derived velocity) or velocity data derived from inertial sensor data from a MEMS-IMU system 330. For example, if CNO data obtained from GNSS data indicates that the GNSS data is below a threshold level of uncertainty or the VPMV is above a threshold value, the MEMS-IMU data preprocessor 745 may cause velocity data calculated from the MEMS-IMU system 330 to be fed to the dual mode Kalman filter 750. For example, velocity data calculated from acceleration data obtained from a MEMS-IMU system can be used by the Kalman filter 750 in its generation of coordinate data over velocity data obtained from the GNSS data.

In some implementations, where GNSS data is derived from more than one GPS satellite system, the process of determining whether the CNO is below a threshold level of uncertainty is based on taking the average of more than one CNO data point from at least two of the GPS satellite systems that were used to provide the GNSS data. In some implementations, the CNO value that is used to determine whether CNO is below the threshold level of uncertainty is calculated using the average CNO value from each satellite system used to generate the GNSS data. In some implementations, the CNO value that is used to determine whether CNO is below the threshold level of uncertainty is calculated using the average CNO value from a subset of the satellite systems used to generate the GNSS data. While the MEMS-IMU data preprocessor 745 is shown as separate from the dual mode Kalman filter 750, in some implementations, the functions of the MEMS-IMU data preprocessor 745 can also be integrated into the dual mode Kalman filter 750. Final coordinates may be continuously output by Kalman filter 750 as a coordinate data stream 760, and may, for example, be set to a 1 Hz output rate based, in some implementations, on the GNSS module 715 having a raw data output rate of 1 Hz. In some implementations, the estimation filter may be a novel dual mode Kalman filter 750 as will be discussed in regards to FIG. 8.

In some implementations, the MEMS-IMU data preprocessor 745 may comprise a novel human walking model usable to estimate a pedestrian walking velocity, wherein the walking speed (e.g., speed or velocity) may be estimated based on a novel linear function based on the gravity component of the MEMS-IMU data sample (e.g., the standard deviation (STD) of an amplitude of the acceleration vector that is aligned with the gravity vector, the mean of an amplitude of the acceleration vector that is aligned with the gravity vector, the max of an amplitude of the acceleration vector that is aligned with the gravity vector, etc.). In some implementations, the MEMS-IMU data sample is based on a 20 datapoint sample of the acceleration vector. While 20 datapoints were used as the sample size, other suitable quantity of datapoints could be used. For example, if the walking speeds are low, more datapoints may need to be used to increase data accuracy. In some implementations, different quantities of datapoints may be used for different pedestrian subjects. After obtaining the acceleration vector datapoints, an amplitude for the datapoints of gravitational component can be calculated as:

$$\text{gravitational amplitude (single datapoint)} =$$
$$ABS(\text{gravitational amplitude single datapoint value} - \text{Mean(sample)})$$

where the Mean(sample) = Sum (gravitational amplitude sample datapoints)
/(# gravitational amplitude sample datapoints)

The walking speed estimation model may be found through linear regression minimizing an error function between the linear function of the gravity component of MEMS-IMU data and simultaneously acquired ground truth velocity data captured during pedestrian walking tests, wherein a human walking model for walking velocity estimation may be found to be:

$$\text{walking speed} = 0.65(STD \text{ gravity component}) + 0.42 \, [m/s];$$

where $m/s$ are the units of meters per second.

It should be appreciated that the values for the constants in the equation may change, such as with more data from pedestrians walking at one or more different speeds, and/or data obtained from a larger number of pedestrians with different walking habits. In some implementations, the human walking model may also be used to determine a standing condition usable to control an operational mode of a standing/walking dual mode Kalman filter 750, wherein a standing activity threshold may be a STD value of 0.45 meters per second squared, or some other suitable value such that when the STD of the gravitational component of the MEMS-IMU accelerometer is less than the standing activity threshold, a standing condition may be assumed to be present. Note that per the above human walking model for walking speed, a STD value of 0.45 meters per second squared equates to a velocity of 0.71 meters per second, and 0.71 meters per second may be used as a standing activity threshold given as a velocity as calculated using the above human walking model. Therefore, using a standing activity threshold of 0.71 meters/second as calculated by the human walking model has the similar effect as using 0.45 meters per second squared as a standing activity threshold when determining a standing condition. It should be appreciated that the above mentioned values for the standing activity threshold may change, such as with data from a larger number of pedestrians walking and standing. When a standing condition is determined, the standing/walking dual mode Kalman filter 750 may be operated in a standing mode to limit or eliminate GNSS drift errors (e.g., where drift in the GNSS signals indicate positions nearby that are other than the actual position of a pedestrian). In some implementations, the human walking model may also comprise a heading function to estimate a heading of a pedestrian, wherein the heading function may be an integration of the MEMS-IMU yaw rate values, which are measurements of the rotation rate about the vertical axis (or the axis aligned with the gravitational component) accumulated over walking and turning activity. However, the yaw rate measurement from the MEMS-IMU may be prone to inaccuracies in sensor measurements which can accumulate over time and may lead to deviations in the estimated heading. For example, a bias of just 0.01 rad/s in the yaw rate measurement can, after a 5-minute walk, lead to a significant error of 172° (which is close to the opposite direction from the true direction) in the estimated heading. To mitigate these errors, the estimated heading can be combined with other measurements such as magnetometer readings. In some implementations, the gravity component of the MEMS-IMU data sample can also be used to distinguish whether a pedestrian is walking straight or making a turn, walking on a substantially flat surface versus walking on up an incline (e.g., up a hill or up stairs). The data can be used to determine additional thresholds beyond whether a pedestrian is standing or walking. These additional thresholds can also be incorporated into the walking velocity estimation calculation to provide a more accurate prediction of a pedestrian's walking speed.

It should be appreciated that a processor, such as processor 310 in mobile location device 10, may be responsible and configured to receive the data streams from the GNSS module 715 and the MEMS-IMU data module 725 and perform the synchronization, and perform calculations which may include Kalman filter 750 calculations. In some implementations, processor 310 may receive the precise GNSS corrections data 720 and apply corrections to GNSS signals from GNSS module 715 without routing the precise GNSS corrections data 720 to the GNSS module 715. In some implementations, a mobile location device does not perform some of the calculations described in FIG. 7. For example, in some implementations, some of the functions like the functions discussed in connection with 745, 750, and 760 may be placed in a remote server (e.g., server 205 from FIG. 2A) or a suitable cloud system. That is, some of the heavier data processing load can be pushed to a remote server. In some such implementations, the mobile location device may send the MEMS-IMU and GNSS data to a remote server for processing.

Figure 8:
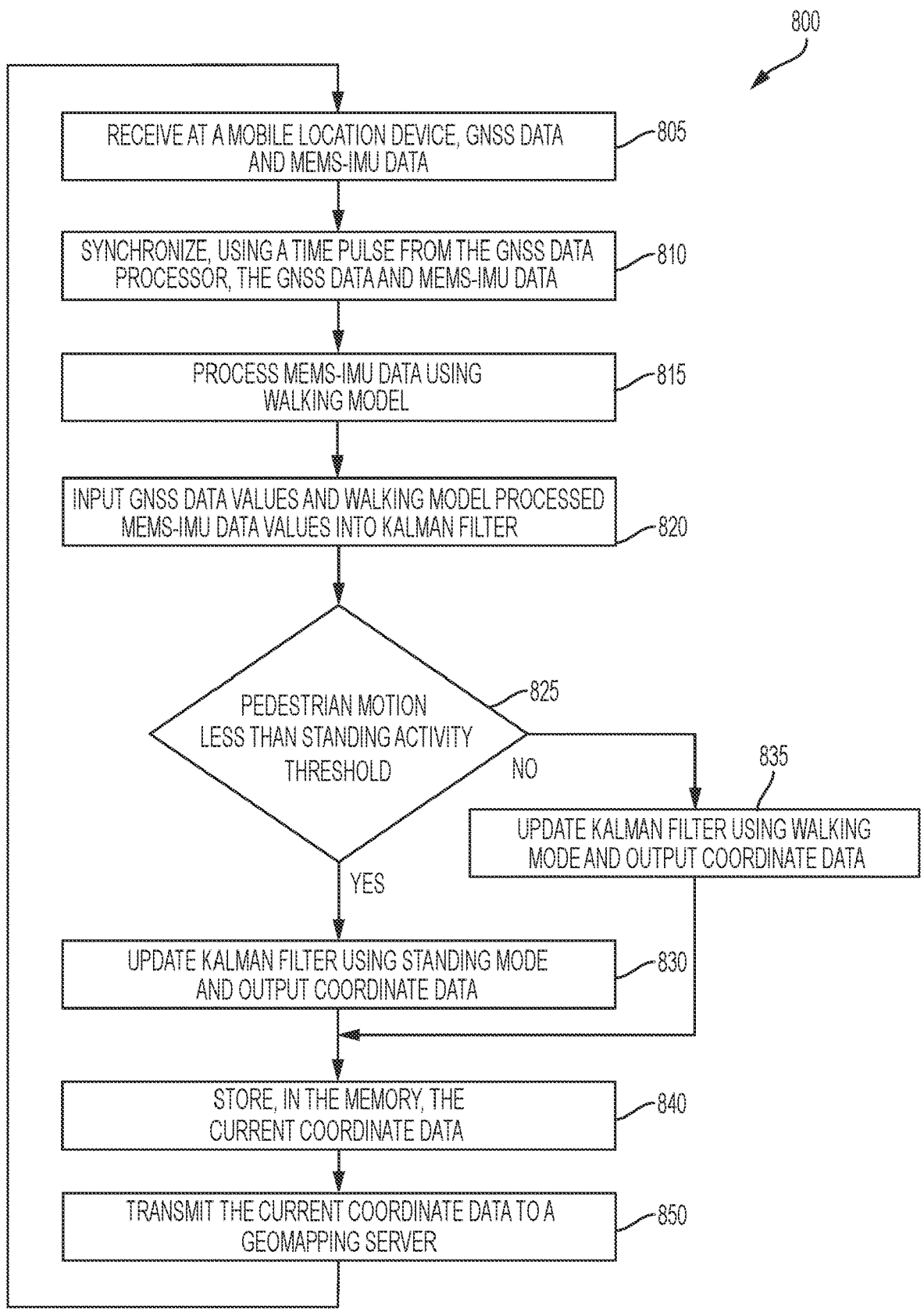
FIG. 8 is a flowchart that illustrates some implementations of the system and method for capturing and calculating coordinate data of a mobile location device.

FIG. 8 is a flowchart of process 800 that illustrates some implementations of the system and method for capturing and calculating high accuracy coordinate data of a mobile location device (e.g., mobile location device 10) configured for pedestrian location. At block 805, in some implementations, a processor, such as a processor of mobile location device 10 can receive GNSS data and non-GNSS motion data (e.g., motion data received from a MEMS-IMU module). In some implementations, for example, GNSS data can be received from the GNSS module 715 and non-GNSS motion data can be received from a MEMS-IMU module 725. As noted in FIG. 7, the GNSS module 715 may receive GNSS satellite data or GNSS satellite data plus correction data from a plurality of other sources in some implementations. Where more than one source of GNSS data is received, a processor of the GNSS module may modify GNSS satellite data with any received corrective data. At block 810, in some implementations, as noted above, the GNSS module obtains timing data from the GNSS data and uses this data to generate a synchronizing timing pulse. In some implementations, a processor of the mobile location device 10 provides the synchronizing timing pulse. Synchronizing timing pulses can be provided using other suitable mechanisms. At block 810, in some implementations, the processor of the mobile location device 10 synchronizes the received GNSS data and the MEMS-IMU data (i.e., non-GNSS motion data) using the timing pulse. At block 815, in some implementations, the processor of the mobile location device 10 may also preprocess MEMS-IMU data (i.e., non-GNSS motion data) to determine pedestrian velocity data to use. For example, the processor of the mobile location device 10 may determine a pedestrian velocity using the human walking model disclosed above, namely:

$$\text{walking speed} = 0.65(STD \text{ gravity component}) + 0.42\ [m/s];$$

where $m/s$ are the units of meters per second, or some other suitable estimation function. In some implementations, the processor of the mobile location device 10 may also preprocess MEMS-IMU data to determine a pedestrian heading as discussed above.

At block 820, the synchronized data values are input into a Kalman filter. In some implementations, the Kalman filter is a novel multimode Kalman filter. In some implementations, the novel multimode Kalman filter is a constant heading, constant velocity (CHCV) Kalman filter, wherein the constant heading, constant velocity (CHCV) model assumes that the pedestrian's heading and velocity remain constant over a short period of time relative to the data rate, wherein a short period of time in this setting may be within the update rate of the MEMS-IMU (e.g., within 0.076 seconds if the IMU is sampled at 13.16 Hz). In some implementations, the novel multimode Kalman filter maintains a state space comprising the following variables shown in a state vector form:

$$\begin{bmatrix} x \\ y \\ \psi \\ v \end{bmatrix} = \begin{bmatrix} \text{Position } X \\ \text{Position } Y \\ \text{Heading} \\ \text{Velocity} \end{bmatrix}$$

In some implementations, the multimode Kalman filter includes a first mode and a second mode. In some implementations, the Kalman filter can include fewer modes or additional modes. In some implementations, the first mode of the Kalman filter is a walking mode which may also be referred to as a dynamic mode where the Kalman filter is updated using dynamic values of the GNSS and non-GNSS data. When operating in the walking mode, the Kalman filter generates predictive values for the state variables, such as those shown in the state vector above which include position coordinate data for a pedestrian, and adjusts probabilities for a model used to generate a next predictive position coordinate data based on the received GNSS data and the non-GNSS motion data. In some implementations, the second mode of the Kalman filter is a standing mode, which may also be referred to as a constant mode, where certain data from the GNSS data and the non-GNSS motion data can be set to a same predetermined value or different predetermined values, wherein the predetermined value(s) are irrespective of the data being received from the GNSS module or a MEMS-IMU data module. In some implementations, certain data from the GNSS data and the non-GNSS motion data (or data derived therefrom, e.g., a velocity derived from gravity component data using the human walking model disclosed above) is altered or replaced for the standing mode of the Kalman filter. The standing mode is referred to as such due a determination that the pedestrian may be assumed to be standing, but may also be referred to as a constant mode since one or more types of data may be set to a predetermined value rather than relying on the dynamic values obtained from the GNSS module or a MEMS-IMU data module. In some implementations, the predetermined value can be zero or some other suitable value. In some implementations, the speed value used by the Kalman filter to generate pedestrian location coordinate data can be set to a predetermined value (e.g., zero or some other suitable number). In some implementations, setting the speed value to a predetermined value may override or otherwise alter a speed value provided by the GNSS module or speed provided by (or derived from) the MEMS-IMU data module. It should be appreciated that other suitable values can be altered for the standing mode of the Kalman filter.

At block 825, where the pedestrian motion is less than a predetermined standing activity threshold, (e.g. the STD of the gravitational component is less than a predetermined standing activity threshold, such as 0.45 meters per second squared or some other suitable value, or the velocity is less than a predetermined standing activity threshold, such as 0.71 meters per second or some other suitable speed), the Kalman filter switches or alters to the second mode or standing mode. For example, as shown in block 830, in some implementations, the Kalman filter updates using the standing mode, and then generates/outputs coordinate data based on the updated predictive model maintained by the Kalman filter. In some implementations, for the standing mode of Kalman filter 750, the velocity is set to zero. In some implementations, when the STD of the gravitational component or the velocity is determined to be below a predetermined standing activity threshold, the Kalman filter may remain in the standing mode until a triggering event occurs. In some implementations, the triggering event can be a predetermined time period. In some implementations, the triggering event can be determining that the STD of the gravitational component or velocity of the pedestrian is above the standing activity threshold. In some implementations, when the triggering event occurs, the Kalman filter may return to the walking mode (e.g., the first mode). In some implementations, when the standing mode is triggered for the Kalman filter, the mobile location device 10 may capture a predetermined number of Kalman filter coordinate outputs from block 830. In some implementations, the predetermined number of captured coordinate outputs is five coordinate outputs from the Kalman filter. In some implementations, the predetermined number can be fewer than five or more than five. In some implementations, the coordinate outputs using the standing mode of the Kalman filter are used to determine a notification that can be triggered based on the pedestrian location, e.g., a notification to: an Uber driver that a rider is at a pickup location, a food service that a customer is present for pick up, a security service that an authorized person is present for entry or exit, a rail station gate entry that should be paid for and triggered to open, etc., wherein some notifications may include enabling an action or transaction such as an automated unlocking and/or opening of a secured door, wherein in some implementations, the reporting of the pedestrian location may form part of an authentication protocol, such as a multifactor authentication protocol. In some implementations, the notification of the pedestrian location may also be used to trigger payment for goods or services.

Returning to block 825, in some implementations, where the STD of the gravitational component or pedestrian velocity is not less than a predetermined standing activity threshold, such as 0.45 meters per second squared or 0.71 meters per second, respectively (or some other suitable threshold value), the Kalman filter in block 835, updates using a walking mode and outputs coordinate data based on the updated predictive model maintained by the Kalman filter. In some implementations, for the walking mode of Kalman filter 750, the velocity is not set to zero (e.g., data values retain their values as input in block 820, such as from the GNSS data and the MEMS-IMU data (e.g., non-GNSS motion data)). In block 840 in some implementations, the coordinate data output based on the updated predictive model of block 830 or block 835 may be stored in memory, and in some implementations, may be sent to a geomapping server as shown in block 850.

In some implementations, the Kalman filter assigns different weights to the data inputs (e.g., GNSS data and MEMS-IMU data) based on an uncertainty matrix calculated to minimize a probabilistic prediction model. For example, if the mobile location device is under a bridge or in a building and the GPS signal is poor (as indicated by CNO, the Carrier to Noise Density data value) the Kalman filter may assign a lower weight to the GNSS data and a higher weight to the MEMS-IMU data for purposes of calculating the coordinate data of the mobile location device. In some implementations, when the Kalman filter is operating in the standing mode (e.g., due to the STD of the gravitational component or pedestrian velocity being below a predetermined standing activity threshold) and the GNSS data consistency exceeds a predetermined consistency level (e.g., has a low associated uncertainty), the Kalman filter may revert to walking mode even where the standing activity condition is met. In some implementations, the Kalman filter determines that the GNSS data consistency exceeds a predetermined consistency level by examining latitude and longitude data provided by the GNSS module. In some such implementations, if a threshold quantity of sequential latitude and longitude data points (or latitude and longitude data points over a given period of time) from the GNSS module indicate that the pedestrian is moving, the Kalman filter may determine that GNSS data should be trusted and the Kalman filter should return to the walking mode (e.g., the first mode). In some implementations, the Kalman filter can remain in the reverted walking mode for a predetermined period of time or until the GNSS data consistency falls below a predetermined consistency level. The Kalman filter can be kept in the walking mode based on other suitable triggering events.

The Kalman filter may generate coordinate data that includes a timestamp, latitude, longitude, and ellipsoidal height. Other suitable outputs can be calculated based on the location data input. In some implementations, the Kalman filter may generate coordinate data with fewer data items.

In some implementations, obtaining a single coordinate data point may be sufficient for location detection purposes. In some implementations, process 800 may operate in a loop as depicted in FIG. 8, thereby maintaining state variables and other values such as weightings of the Kalman filter thereby maintaining a track on current position and eliminating a startup initialization time for the filter to reestablish its state variables and other values the next time it is needed to calculate estimated location data. Such an initialization process is not described in detail, but in some implementations, it may be expressed as a minimum number of cycles (loops) of process 800. As noted above, in block 850, the processor of the mobile location device may transmit the coordinate data point to a local system or module or to a remote system, such as a geomapping server as shown, to use the coordinate data determined by the mobile location device 10. In some implementations, such transmission of coordinate data output from the Kalman filter process may occur on every point, or some other interval of calculated data points or time (e.g., every other data point, every fifth, data point every 20 secs, etc.). In some implementations, such transmission may be based on a query for a current position received by the processor. In some implementations, such transmission may be based on a trigger event, such as a detected standing condition, or a transition from standing condition to walking condition. In some implementations a predetermined number of data points may be sent in response to a trigger event, e.g., 5 data points, 10 data points, or some other suitable number of data points. In some implementations, a combination of intervals, queries, trigger events, and/or system states may be used to transmit current coordinate data.

In some implementations, a mobile location device does not perform some of the processes described in FIG. 8. For example, in some implementations, some of the processes like the processes discussed in connection with 815-850 may take place on a remote server (e.g., server 205 from FIG. 2A) or a suitable cloud system. That is, some of the heavier data processing load can be pushed to a remote server. In some such implementations, the mobile location device may send the MEMS-IMU and GNSS data to a remote server for processing, such as the geomapping server previously mentioned. The coordinate data can then be access by the server faster to provide the value added services to a pedestrian that are discussed herein, such as walking directions, payment transactions, etc. that are based on the pedestrian's precise location determined in part by the mobile location device. In some implementations, a geomapping server obtains precise location data from a mobile location device and determines that a pedestrian is within a stored geolocated polygon. The stored geolocated polygon may cause the geomapping server to perform additional tasks for the pedestrian. For example, the geomapping server may determine that geolocated polygon is associated with pickup point for goods or services provided by a retail location. The geomapping server may trigger payment for the goods or services and also trigger a message to a remote server for the retail location that the pedestrian is ready to pick up their preordered goods. As another example, the geomapping server may determine that geolocated polygon is associated with a particular entry gate for public transportation. The geomapping server may trigger payment for the transportation services and also trigger a message to a server for the transportation service to open the particular entry gate (and causes the entry gate to open) so that the pedestrian may enter the facility and use the transportation service.

It should be appreciated that the high accuracy location detection of the mobile location devices may not have GNSS data available for the location detection, and in some implementations (not shown), the process 800 of determining the geographic position of the mobile location device may use other sources of location data. For example, low energy wireless beacons may be installed throughout a geographic region. These low energy wireless beacons may broadcast location information similar to the GNSS data obtained from satellites. In one implementation, one or more location beacons may be installed in, for example, a parking garage, or a shopping mall, or other locations which may prevent acquisition of GNSS data. Thus, when the mobile location device enters such a location, the mobile location device can receive the location data broadcasts from the one or more beacons to determine that the mobile location device is at a particular location. Similarly, cellular tower triangulation and IEEE 802.11 (WiFi) triangulation can be used when other location data signals are unavailable.

It should be appreciated that a low cost, but high accuracy location detection can be used in a number of different systems that use geographic position information. In some implementations, as noted above, a transportation entry system (e.g., to access a rail gate or to board a bus) and transportation payment system may require a high accuracy location detection to determine whether a mobile location device is in a geolocated zone associated with a particular transportation system. In some implementations, the high accuracy location detection is useful for improved pedestrian navigation systems to avoid providing incorrect directions (wherein, the more accurate position information can be supplied for example to a mobile phone's navigation application to obtain better directions). In some implementations, the high accuracy location detection can be supplied to a cloud based navigation system, which can in turn provide back to the pedestrian's mobile location device or mobile phone more accurate directions. In some implementations, an automated curbside pickup system may require a high accuracy location detection to determine whether a pedestrian is located in particular geolocated pickup zone. In some implementations, the mobile location device can interact with rail station gate pass systems to provide rail payments and to trigger opening of a rail gate. The above list of uses for the high accuracy location detection system and method are merely examples and other suitable uses are contemplated.

Implementations described herein may be implemented in hardware, firmware, software, or any combination thereof. Implementations of the disclosure herein may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); hardware memory in handheld computers, PDAs, smart phones, and other portable devices; magnetic disk storage media; optical storage media; USB drives and other flash memory devices; Internet cloud storage, and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

Although method/process operations (e.g., blocks) may be described in a specific order, it should be understood that other housekeeping operations can be performed in between operations, or operations can be adjusted so that they occur at different times or can be distributed in a system which allows the occurrence of the processing operations at various intervals associated with the processing, as long as the processing of the overlay operations are performed in the desired way.

The present disclosure is not to be limited in terms of the particular implementations described in this disclosure, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations have been described. Various modifications may be made without departing from the spirit and scope of the disclosure. For example, various forms of the method/process flows shown above may be used, with operations or steps re-ordered, added, or removed. Accordingly, other implementations are within the scope of the following claims.

We claim:

1. A location device comprising:
a processor; and
a memory device that stores a plurality of instructions, which when executed by the processor, causes the processor to be configured to:
configure an estimation filter having at least two modes, the at least two modes comprising a standing mode and a walking mode, to operate in the walking mode;
receive, global navigation satellite systems (GNSS) data and inertial sensor data, wherein the GNSS data and the inertial sensor data are associated with a pedestrian;
calculate, an acceleration related value of the pedestrian based on the inertial sensor data, wherein the acceleration related value is determined in part based on a plurality of gravitational amplitude data points determined from the inertial sensor data;
determine that the acceleration related value is below a standing activity threshold;
alter the estimation filter to operate in the standing mode based on the acceleration related value being below the standing activity threshold;
calculate, in the estimation filter operating in the standing mode, a position location of the pedestrian, wherein at least some of the GNSS data and the inertial sensor data is altered for the estimation filter to determine the position location of the pedestrian; and
transmit the position location of the pedestrian to a geomapping server enabling a pedestrian navigation system.

2. The location device of claim 1, wherein the alteration of the at least some of the GNSS data and the inertial sensor data results in data for a pedestrian velocity being altered.

3. The location device of claim 1, wherein the acceleration related value for the pedestrian is determined from a function of the plurality of gravitational amplitude data points.

4. The location device of claim 3, wherein the function is a linear function of the plurality of gravitational amplitude data points.

5. The location device of claim 1, wherein the processor is further configured to calculate and communicate to the geomapping server a plurality of location points when the estimation filter is operating in the standing mode.

6. The location device of claim 1, wherein the processor is further configured to calculate and communicate to the geomapping server a plurality of location points when the estimation filter is operating in the walking mode.

7. The location device of claim 1, wherein the estimation filter is a Kalman filter, and wherein the Kalman filter includes a plurality of modes.

8. The location device of claim 1, wherein the estimation filter is a constant heading constant velocity Kalman filter and the Kalman filter maintains state variables comprising an x position coordinate, a y position coordinate, a speed and a heading of the pedestrian.

9. The location device of claim 1, wherein the pedestrian navigation system comprises a navigation application operating on a user device of the pedestrian.

10. The location device of claim 1, wherein the pedestrian navigation system generates audio guidance for the pedestrian.

11. A method for processing pedestrian location comprising:
configuring an estimation filter having at least two modes, the two modes comprising a standing mode and a walking mode, to operate in the walking mode;
receiving, global navigation satellite systems (GNSS) data and inertial sensor data, wherein the GNSS data and the inertial sensor data are associated with a pedestrian;

calculating, an acceleration related value of the pedestrian based on the inertial sensor data, wherein the acceleration related value is determined in part based on a plurality of gravitational amplitude data points determined from the inertial sensor data;

determining that the acceleration related value is below a standing activity threshold;

altering the estimation filter to operate in the standing mode based on the acceleration related value being below the standing activity threshold;

calculating, in the estimation filter operating in the standing mode, a position location of the pedestrian, wherein at least some of the GNSS data and the inertial sensor data is altered for the estimation filter to determine the position location of the pedestrian; and transmitting the position location of the pedestrian to a geomapping server enabling a pedestrian navigation system.

12. The method of claim 11, wherein the alteration of the at least some of the GNSS data and the inertial sensor data results in data for a pedestrian velocity being altered.

13. The method of claim 11, wherein the acceleration related value for the pedestrian is determined from a function of the plurality of gravitational amplitude data points.

14. The method of claim 13, wherein the function is a linear function of the plurality of gravitational amplitude data points.

15. The method of claim 11, further comprising, calculating and communicating to the geomapping server a plurality of location points when the estimation filter is operating in the standing mode.

16. The method of claim 11, further comprising, calculating and communicating to the geomapping server a plurality of location points when the estimation filter is operating in the walking mode.

17. The method of claim 11, wherein the estimation filter is a Kalman filter, and wherein the Kalman filter includes a plurality of modes.

18. The method of claim 11, wherein the estimation filter is a constant heading constant velocity Kalman filter and the Kalman filter maintains state variables comprising an x position coordinate, a y position coordinate, a speed and a heading of the pedestrian.

19. The method of claim 11, wherein the pedestrian navigation system comprises a navigation application operating on a user device of the pedestrian.

* * * * *